United States Patent
Sabry et al.

(10) Patent No.: US 12,228,510 B2
(45) Date of Patent: Feb. 18, 2025

(54) INTEGRATED DEVICE FOR FLUID ANALYSIS

(71) Applicant: Si-Ware Systems, Cairo (EG)

(72) Inventors: Yasser M. Sabry, Cairo (EG); Alaa Fathy, Cairo (EG); Diaa Abdelmaguid Khalil, Cairo (EG); Tarik Bourouina, Cairo (EG); Bassam A. Saadany, Cairo (EG)

(73) Assignee: SI-WARE SYSTEMS, Cairo (EG)

( * ) Notice: Subject to any disclaimer, the term of this patent is extended or adjusted under 35 U.S.C. 154(b) by 830 days.

(21) Appl. No.: 16/885,186

(22) Filed: May 27, 2020

(65) Prior Publication Data

US 2020/0378892 A1    Dec. 3, 2020

Related U.S. Application Data

(60) Provisional application No. 62/853,671, filed on May 28, 2019.

(51) Int. Cl.
*G01N 21/61* (2006.01)
*G01N 21/03* (2006.01)
*G01N 21/05* (2006.01)

(52) U.S. Cl.
CPC .......... *G01N 21/61* (2013.01); *G01N 21/031* (2013.01); *G01N 21/05* (2013.01); *G01N 2021/058* (2013.01)

(58) Field of Classification Search
CPC ...... G01N 21/61; G01N 21/031; G01N 21/05; G01N 2021/058; G01N 27/407; G01N 2021/3595; G01N 21/3504; G01N 21/39
See application file for complete search history.

(56) References Cited

U.S. PATENT DOCUMENTS 5,245,405 A * 9/1993 Mitchell .............. G01N 21/15
356/245
5,444,249 A 8/1995 Wong
(Continued)

FOREIGN PATENT DOCUMENTS

CN 103954577 A 7/2014
CN 108535191 A 9/2018
(Continued)

OTHER PUBLICATIONS

International Search Report and Written Opinion, PCT/US2020/034970, Nov. 25, 2020, 40 pgs.
(Continued)

*Primary Examiner* — David P Porta
*Assistant Examiner* — Gisselle M Gutierrez
(74) *Attorney, Agent, or Firm* — Loza & Loza, LLP; Holly L. Rudnick

(57) ABSTRACT

Aspects relate to a miniaturized gas cell that may be implemented into an integrated device for gas analysis. The miniaturized gas cell may be a multi-pass gas cell or a hollow waveguide gas cell. In some aspects, the miniaturized gas cell may include a bottom surface and sidewalls formed in a substrate (e.g., a silicon substrate or silicon on insulator (SOI) substrate). The gas cell further includes at least one gas inlet and at least one gas outlet coupled for injection of a gas into and out of the gas cell, respectively. In addition, the gas cell further includes an optical input and an optical output, each optically coupled to direct light into and out of the gas cell, respectively. In addition, a capping layer may be bonded to the substrate to form a top surface of the gas cell.

35 Claims, 20 Drawing Sheets

(56) References Cited

U.S. PATENT DOCUMENTS

| | | | |
|---|---|---|---|
| 5,726,752 A | 3/1998 | Uno et al. | |
| 6,469,303 B1 | 10/2002 | Sun et al. | |
| 2002/0105650 A1 | 8/2002 | Stuttard | |
| 2005/0280825 A1* | 12/2005 | Oka | G01N 21/031 |
| | | | 356/437 |
| 2006/0086903 A1 | 4/2006 | Hopkins et al. | |
| 2009/0103852 A1* | 4/2009 | Hamamoto | A61B 5/097 |
| | | | 385/12 |
| 2009/0195778 A1 | 8/2009 | Yankov | |
| 2010/0079760 A1 | 4/2010 | Bernacki | |
| 2010/0102893 A1* | 4/2010 | Chindo | H03L 7/26 |
| | | | 331/94.1 |
| 2010/0225917 A1* | 9/2010 | Dreyer | G01N 21/3504 |
| | | | 356/454 |
| 2010/0315647 A1 | 12/2010 | Saadany et al. | |
| 2012/0199744 A1 | 8/2012 | Martin | |
| 2013/0003046 A1* | 1/2013 | Izawa | G01N 21/0303 |
| | | | 356/51 |
| 2013/0081447 A1 | 4/2013 | Carter et al. | |
| 2014/0192365 A1 | 7/2014 | Mortada et al. | |
| 2015/0091662 A1* | 4/2015 | Yoshida | G04F 5/145 |
| | | | 331/94.1 |
| 2015/0285737 A1 | 10/2015 | Gliere et al. | |
| 2015/0377775 A1 | 12/2015 | Sakai et al. | |
| 2016/0033783 A1* | 2/2016 | Maeda | G01J 1/0414 |
| | | | 356/218 |
| 2016/0054220 A1* | 2/2016 | Nishijima | G01N 21/359 |
| | | | 356/409 |
| 2016/0356700 A1 | 12/2016 | Rouxel et al. | |
| 2017/0012199 A1* | 1/2017 | Sabry | G01J 3/0208 |
| 2017/0363469 A1 | 12/2017 | Sabry et al. | |
| 2018/0120222 A1 | 5/2018 | Fritz et al. | |
| 2018/0372618 A1 | 12/2018 | Kwak et al. | |
| 2019/0064061 A1 | 2/2019 | Gudeman | |
| 2020/0284654 A1* | 9/2020 | Sabry | G01N 21/031 |
| 2023/0030197 A1* | 2/2023 | Dougakiuchi | G01J 3/427 |

FOREIGN PATENT DOCUMENTS

| | | |
|---|---|---|
| DE | 4214840 A1 | 11/1993 |
| KR | 20070067527 A | 6/2007 |
| SU | 1080076 A1 | 3/1984 |

OTHER PUBLICATIONS

Invitation to Pay Additional Fees and Partial Search Report for PCT/US2020/034970 dated Sep. 3, 2020; 21 pages.

Fathy, Alaa et al. "Silicon Multi-Pass Gas Cell for Chip-Scale Gas Analysis by Absorption Spectroscopy", Micromachines, vol. 11, No. 5, Apr. 28, 2020, 11 pgs.

Verpoorte, E. et al. "A novel optical detector cell for use in miniaturized total chemical analysis systems", Transducers, San Francisco, Jun. 24-27, 1991, pp. 796-799.

\* cited by examiner

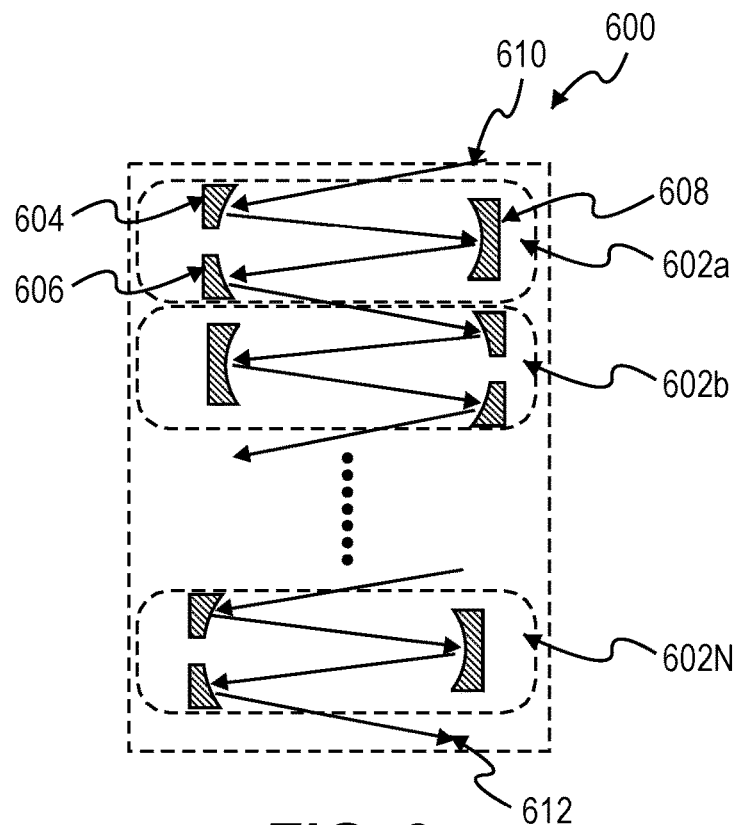
FIG. 6
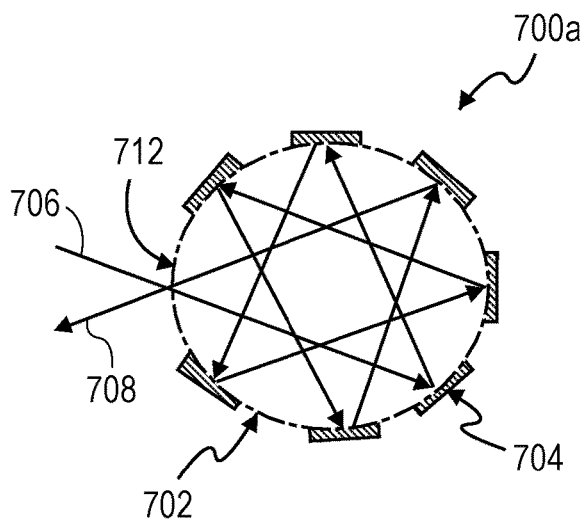 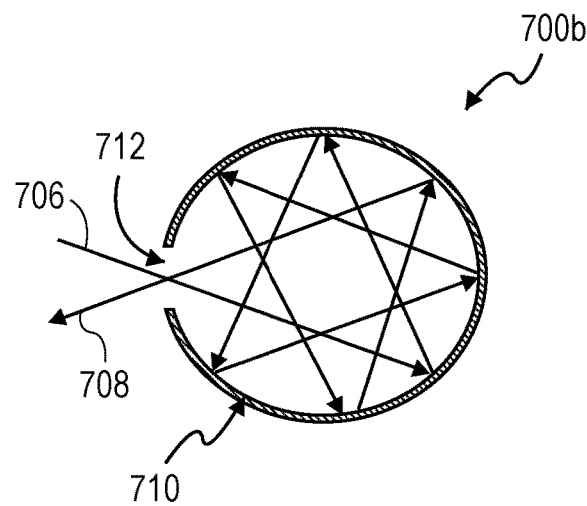
FIG. 7A　　　　　FIG. 7B

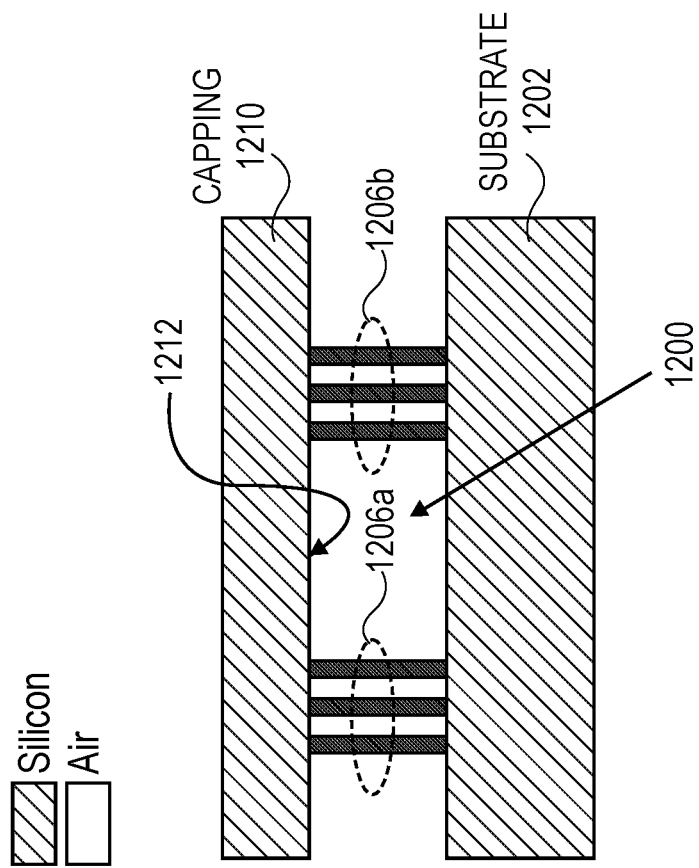
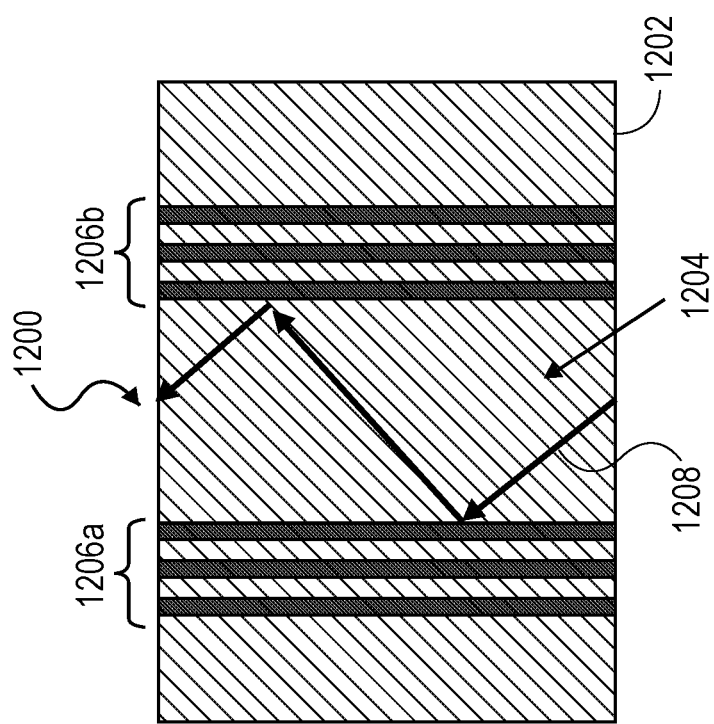
FIG. 12B
FIG. 12A

INTEGRATED DEVICE FOR FLUID ANALYSIS

PRIORITY CLAIM

This application claims priority to and the benefit of Provisional Application No. 62/853,671, filed in the U.S. Patent and Trademark Office on May 28, 2019, the entire content of which is incorporated herein by reference as if fully set forth below in its entirety and for all applicable purposes.

TECHNICAL FIELD

The technology discussed below relates generally to optical-based devices for fluid analysis, and in particular to the use of semiconductor technology to fabricate gas cells for inclusion in fluid analyzers and to integrate gas cells with other components on the same die.

BACKGROUND

A gas cell may be filled with a fluid, such as a liquid, gas, or plasma. The fluid inside the gas cell may be detected by sending light through the gas cell. A portion of the light is absorbed by the fluid, while the rest may be detected, for example, by a spectrometer. One type of gas cell is a multi-pass gas cell. Multi-pass gas cells may be used to multiply the fluid absorption length by reflecting light through multiple passes in the same fluid volume using high reflectivity mirrors. Examples of multi-pass gas cells may include, but are not limited to, White gas cells, Herriott gas cells, astigmatic Herriott gas cells, circular gas cells, and integrating sphere gas cells.

Another type of gas cell is a hollow waveguide gas cell. The waveguide may be filled with the fluid to be measured. Light may then be injected into the waveguide from one side, where the light is guided via metallic walls of the waveguide and absorbed by the fluid until the light reaches the other side. In these structures, the light impinges the metallic walls of the waveguide many times. Using a high reflectivity metal for the waveguide walls limits the insertion loss and reduces imaging aberrations due to the multiple reflections.

Miniaturization of fluid analyzers may be achieved using a micro-electro-mechanical-systems (MEMS) spectrometer. However, further miniaturization of the gas cells themselves may increase compatibility with MEMS technology, allow for integration of gas cells with sensors and other components, and enable mass production of integrated devices for fluid analysis.

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to miniaturized gas cells fabricated using semiconductor technology. The miniaturized gas cell may be a multi-pass gas cell or a hollow waveguide gas cell. In some aspects, the miniaturized gas cell may include a bottom surface and sidewalls formed in a substrate (e.g., a silicon substrate or silicon on insulator (SOI) substrate). In some examples, the bottom surface and/or sidewalls may be coated with a reflective material, such as a metal or dielectric coated metal. In other examples, the bottom surface and/or sidewalls may include silicon Bragg mirrors. The gas cell further includes at least one gas inlet and at least one gas outlet coupled for injection of a fluid, such as a gas, liquid, or plasma, into and out of the gas cell, respectively. In addition, the gas cell further includes an optical input and an optical output, each optically coupled to direct light into and out of the gas cell, respectively. The light may be guided in the gas cell by at least the bottom surface and the sidewalls.

In some aspects, the gas cell may further include a capping layer bonded to the substrate. The capping layer may include an interior surface forming a top surface of the gas cell. In some examples, the interior surface may be coated with the reflective material or may include silicon Bragg mirrors. In some examples, through holes in the capping layer may form the gas inlet(s) and gas outlet(s).

In examples in which the gas cell is a hollow waveguide gas cell, the gas cell may include a waveguide pattern forming the hollow waveguide and defining a light path of the light propagating in the gas cell. For example, the waveguide pattern may include an array of horizontal waveguides optically coupled thereto via respective corner cube mirrors or respective circular toruses.

In examples in which the gas cell is a multi-pass gas cell, the gas cell may include a set of two or more curved reflectors formed in the substrate (e.g., in the sidewalls of the gas cell) to produce multiple reflections of the light. For example, the set of two or more curved reflectors may include two arrays of curved mirrors positioned along opposing sides of the gas cell, where each array may be offset with respect to the other. As another example, the set of two or more curved reflectors may include two pairs of curved mirror arrays that are perpendicular to one another. In this example, the gas cell may further include a tilted mirror optically coupled to direct the light from one pair of curved mirror arrays to the other pair of curved mirror arrays. In some examples, the multi-pass gas cell may be a circular multi-pass gas cell that includes a concentric array of curved mirrors or a one-piece circular mirror.

Aspects of the disclosure further relate to integration of the miniaturized gas cell with sensors and other components on the same die. In some examples, the die may include a MEMS-based interferometer, such as a MEMS spectrometer, optically coupled to the gas cell. The die may further include an integrated light source, such as a black silicon light source, optically coupled to the gas cell. Various sensors, such as pressure sensors, temperature sensors, air flow sensors, and other suitable sensors may further be integrated on the die.

In one example, an integrated device for fluid analysis is provided. The integrated device includes a substrate and a gas cell having a bottom surface and sidewalls formed in the substrate. The gas cell further includes at least one gas inlet and at least one gas outlet coupled for injection of a fluid into and out of the gas cell, respectively, and an optical input and an optical output, each optically coupled to direct light into and out of the gas cell, respectively. The light can be guided in the gas cell by the sidewalls and the bottom surface of the gas cell.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6 is a diagram illustrating another example of a reflector design in a rectangular multi-pass gas cell according to some aspects.

FIGS. 7A and 7B are diagrams illustrating examples of reflector designs in circular multi-pass gas cells according to some aspects.

FIGS. 12A and 12B are diagrams illustrating an example of a hollow waveguide including sidewalls formed of Bragg mirrors according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
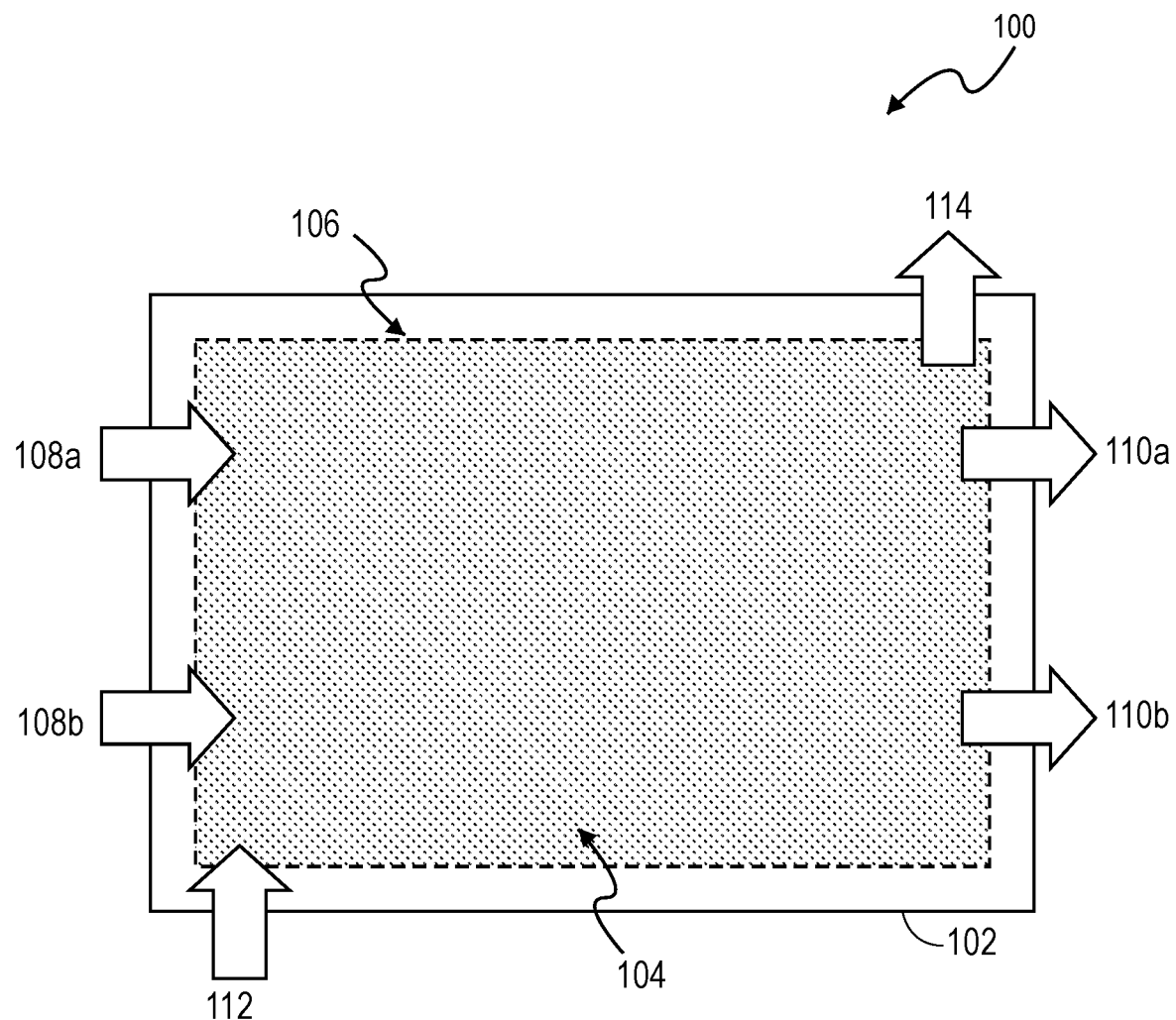
FIG. 1 is a diagram illustrating an example of a top view of a miniaturized gas cell according to some aspects.

FIG. 1 is a diagram illustrating an example of a top view of a miniaturized gas cell 100 according some aspects. The gas cell 100 is shown formed in a substrate 102. The substrate 102 may be, for example, a simple silicon substrate or a silicon on insulator (SOI) substrate. The gas cell 100 includes a bottom surface 104 and sidewalls 106 (e.g., lateral walls) formed in the substrate 102. In some examples, the bottom surface 104 and/or the sidewalls 106, may be coated with a reflective material. For example, the reflective material may be a metal or a dielectric coated metal. In other examples, the bottom surface 104 and/or the sidewalls 106 may include silicon Bragg mirrors.

A fluid (e.g., a gas, liquid, or plasma) may enter the gas cell 100 via one or more gas inlets, two of which 108a and 108b are shown for convenience. In addition, the fluid may exit the gas cell 100 via one or more gas outlets, two of which 110a and 110b are shown for convenience. The fluid inside the gas cell 100 may be detected by directing light into the gas cell 100 via an optical input 112. The light may be guided in the gas cell 100 by the bottom surface 104 and the sidewalls 106. In some examples, the gas cell 100 further includes other optical components for guiding light in the gas cell 100. For example, in a multi-pass gas cell configuration, the gas cell 100 may include a set of two or more curved reflectors (e.g., cylindrical or spherical mirrors) for rectangular gas cells or a one-piece circular mirror for circular gas cells. In a hollow waveguide gas cell configuration, the gas cell 100 may include a waveguide pattern formed by the sidewalls 106 and additional sidewalls formed within the area of the bottom surface 104.

A portion of the light may be absorbed by the fluid, while the remainder of the light may be output via an optical output 114. The optical output 114 may direct the output light to, for example, a spectrometer (not shown in FIG. 1) and a detector (not shown in FIG. 1). For example, the spectrometer may include an FTIR spectrometer configured to produce an interferogram that may be detected by the detector. The output of the detector may be processed to obtain the spectrum of the detected light, which may then be utilized to identify the fluid or obtain other parameters associated with the fluid, such as the concentration of the fluid, the energy content in the fluid, the total volatile organic compound, the amount of particulate matter in the fluid, the microparticles suspended in the fluid, or other suitable parameters.

In some examples, the gas cell 100 may be fabricated in the substrate 102 using semiconductor fabrication technology. For example, the gas cell design may be drawn on a mask. The mask profile may then be translated onto a wafer (e.g., a silicon or SOI wafer) using a lithography process. Deep reactive ion etching (DRIE) may then be applied to the wafer to etch the depth of the bottom surface 104 and form the sidewalls 106. In examples in which a reflective metallic material is used to direct the light in the gas cell 100, metallization can then be applied to the bottom surface 104 and the sidewalls 106 using, for example, sputtering. In examples in which Bragg mirrors are used to direct the light along the bottom surface 104 in the gas cell 100, successive pairs of silicon and silicon dioxide may be deposited on the bottom surface 104 using, for example, a chemical vapor deposition (CVD) process. In this example, a mask may be used to avoid deposition of materials on the sidewalls 106. In examples in which Bragg mirrors are used to direct the light along the sidewalls 106 in the gas cell 100, the sidewalls 106 may be fabricated using a mask and DRIE to create successive pairs of silicon and air. In this example, Bragg mirrors may further be deposited on the bottom surface 104 or the bottom surface 104 may be metallized using a mask to avoid metallization of the sidewalls 106.

The gas cell 100 may utilized in various applications, such as sensing natural gas, biomethane, flare gas, greenhouse gases (e.g., $CO_2$ and $CH_4$ in the atmosphere), or volatile organic compounds. The gas cell 100 may further be utilized in other oil and gas applications, environmental applications, particulate material detection applications in conjunction with gas absorption applications, and other suitable applications.

The gas cell 100 may further be integrated with sensors and other components on the same die. For example, the gas cell 100 may be integrated with an interferometer, such as a micro-electro-mechanical-systems (MEMS) spectrometer, on the die. As used herein, the term MEMS refers to the integration of mechanical elements, sensors, actuators and electronics on a common substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. One example of a MEMS element is a micro-optical component having a dielectric or metallized surface working in a reflection or refraction mode. Other examples of MEMS elements include actuators, detector grooves, and fiber grooves.

In some examples, a MEMS spectrometer may include one or more micro-optical components (e.g., one or more reflectors or mirrors) that may be moveably controlled by a MEMS actuator. For example, the MEMS spectrometer may be fabricated using a DRIE process on the substrate 102 (e.g., a SOI wafer) in order to produce the micro-optical components and other MEMS elements that are able to process free-space optical beams propagating parallel to the SOI substrate.

The gas cell 100 may further be integrated with a light source, such as a black silicon thermal emitter, on the die. The die may also include micro-pumps (not shown in FIG. 1) coupled to the gas inlets 108a and 108b and gas outlets 110a and 110b to drive the gas into and out of the gas cell 100. In some examples, the micro-pumps may be monolithically integrated micro-pumps. The die may further include one or more sensors, such as temperature sensors, humidity sensors, pressure sensors, air flow sensors, density sensors, and other suitable sensors. In some examples, the gas cell 100 may be a photo-acoustic gas cell.

Figure 2A:
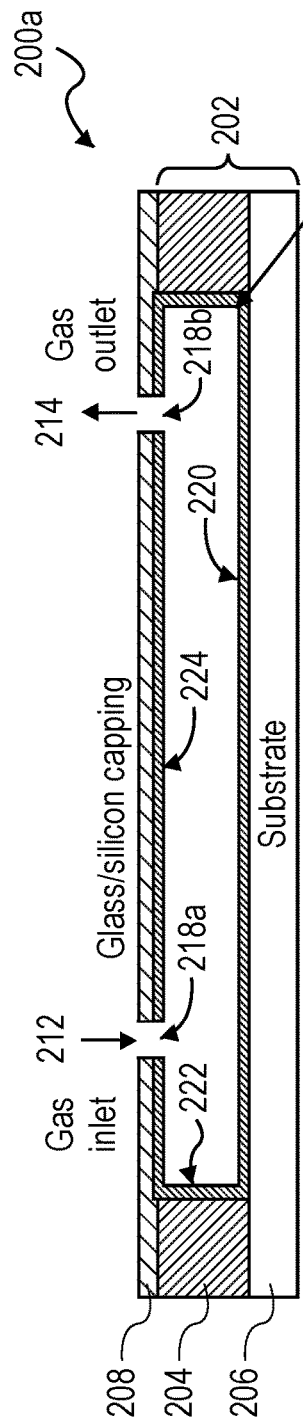
FIGS. 2A-2C are diagrams illustrating examples of cross-sectional views of the gas cell of FIG. 1.
Figure 2B:
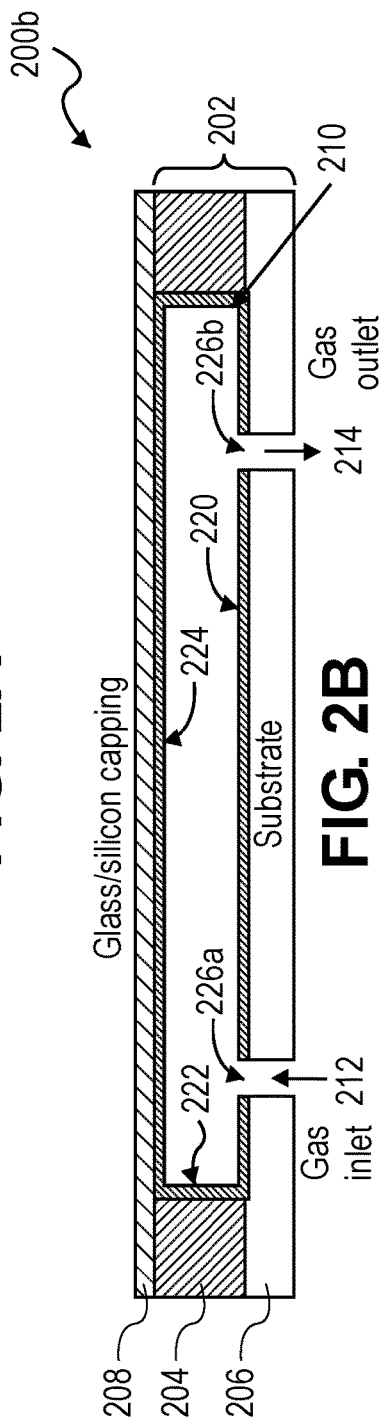
Figure 2C:
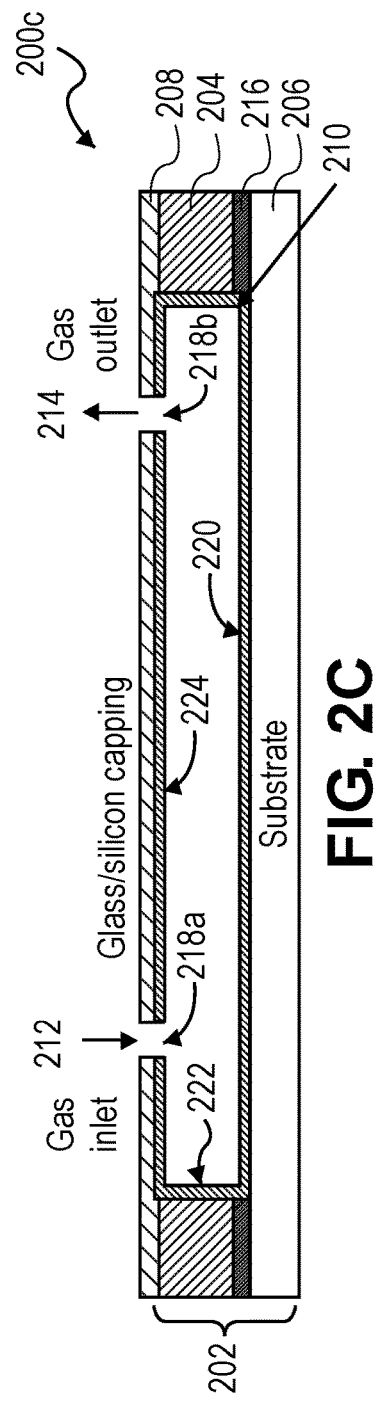

FIGS. 2A-2C are diagrams illustrating examples of cross-sectional views of the gas cell of FIG. 1. In the examples shown in FIGS. 2A-2C, gas cells 200a, 200b, and 200c are formed within a substrate 202. In the example shown in FIGS. 2A and 2B, the substrate 202 is a silicon substrate including, for example, a device layer 204 and a handle layer 206. In the example shown in FIG. 2C, the substrate 202 is an SOI substrate including, for example, the device layer 204, the handle layer 206, and an oxide layer 216 between the device layer 204 and the handle layer 206. The bottom surface 220 and sidewalls 222 of the gas cells 200a-200c are shown formed in the device layer 204, such that the bottom surface 220 of the gas cells 200a-200c is on the handle layer 206. However, it should be understood that, in other examples, the gas cells 200a and 200b may be formed in the handle layer 206. In this example, the bottom surface 220 may be on the device layer 204.

A capping layer 208 is bonded to the substrate 202 to seal the gas cells 200a-200c on the top. For example, the capping layer 208 may be bonded to the device layer 204 (e.g., using heat) in un-etched areas of the device layer 204 surrounding the structure of the gas cells 200a-200c. The capping layer 208 includes an interior surface 224 that forms a top surface of the gas cells 200a-200c within an area of the interior surface 224 that is aligned with the bottom surface 220. The capping layer 208 may include, for example, another substrate (e.g., silicon or SOI substrate) or a glass substrate.

A reflective material 210 is shown deposited onto the bottom surface 220, the sidewalls 222, and the top surface 224 of the gas cells 200a-200c. The reflective material 210 may include, for example, a metal or dielectric coated metal. For example, the metal may include aluminum, gold, or silver. For un-polarized light with a large incidence angle and a wavelength range between 3-4 µm, silver may have a higher reflection coefficient than aluminum or gold.

In some examples, the metal reflectivity may be enhanced by introducing dielectric layers into the metal surface. For example, $SiO_2$, $Si_3N_4$, $TiO_2$, or other suitable dielectric materials compatible with semiconductor fabrication technology may be used to form the reflective material 210. The dielectric layers may be deposited using chemical vapor deposition (CVD), atomic layer deposition (ALD), or other suitable deposition methods. The dielectric coating may be applied on both the vertical sidewalls 222 as well as horizontal surfaces (e.g., the top surface 224 and the bottom surface 220). In addition, more than one dielectric layer may be applied for reflection enhancement. In some examples, the thickness of the dielectric layer(s) may be optimized by sweeping of the dielectric thickness to obtain an optimum thickness of maximum reflection for un-polarized light. In examples in which the light is polarized, the merit function of the optimization may be the reflection for the respective polarization. For example, sputtering of 210 nm of TiO$_2$ on silver coated surfaces 220, 222, and 224 may enhance the reflectivity to greater than 99.5%.

In the example shown in FIGS. 2A and 2C, the capping layer 208 includes through holes 218a and 218b forming a gas inlet 212 and a gas outlet 214. In some examples, the capping layer through holes 218a and 218b may be formed using a mask and etching the capping layer 208. In the example shown in FIG. 2B, the handle layer 206 includes through holes 226a and 226b forming the gas inlet 212 and gas outlet 214. In some examples, the handle layer through holes 226a and 226b may be formed using a back-side DRIE process. It should be understood that the gas cells 200a-200c may include multiple gas inlet through holes and/or multiple gas outlet through holes, where the number and position of the gas through holes may be configured to satisfy one or more conditions. For example, the gas through holes 218a/218b or 226a/226b may be distributed in the center, sides, and corners of the gas cells 200a-200c to facilitate filling the entire gas cells 200a-200c with gas or other fluid. In addition, the number of gas through holes 218a/218b or 226a/226b and/or diameter of the gas through holes 218a/218b or 226a/226b may be increased to avoid slow filling of the gas cells 200a-200c. Furthermore, the gas through holes 218a/218b or 226a/226b may be positioned outside the light path to avoid introducing losses in the light guidance.

Figure 3:
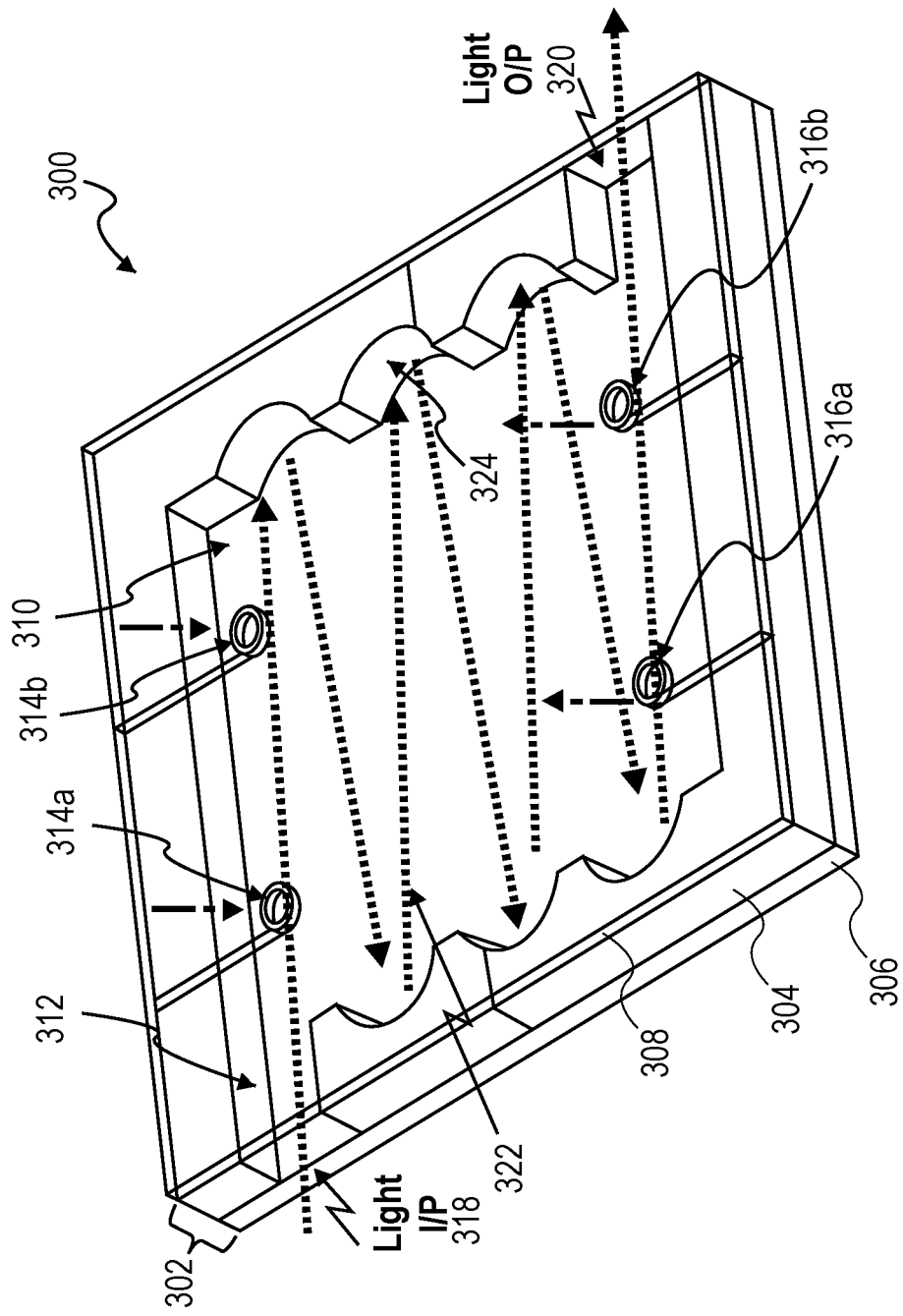
FIG. 3 is a diagram illustrating an example of a multi-pass gas cell according to some aspects.

FIG. 3 is a diagram illustrating an example of a multi-pass gas cell 300 in accordance with some aspects. The multi-pass gas cell 300 is formed in a substrate 302 (e.g., a silicon substrate), which includes a device layer 304 and a handle layer 306. In the example shown in FIG. 3, the multi-pass gas cell 300 is formed in the device layer 304 of the substrate 302. A capping layer 308 is attached to the device layer 304 of the substrate 302. The capping layer 308 may be, for example, another silicon substrate or a glass substrate. The capping layer 308 is illustrated as transparent in FIG. 3 to expose the inner structure of the multi-pass gas cell 300.

The multi-pass gas cell 300 includes a bottom surface 310 and sidewalls 312 formed in the device layer 304 of the substrate 302. The multi-pass gas cell 300 further includes a top surface formed by an interior surface of the capping layer 308. The capping layer 308 includes a plurality of through-holes 314a, 314b, 316a, and 316b for gas injection into and out of the gas cell 300. For example, through-holes 314a and 314b in the capping layer 308 form gas inlets, while through-holes 316a and 316b in the capping layer 308 form gas outlets.

Openings 318 and 320 in the device layer 304 further form an optical input (Light I/P) and an optical output (Light O/P) 320, respectively. For example, light 322 may enter the gas cell 300 via the optical input opening 318 and may be reflected through multiple passes using a set of reflectors 324. A portion of the light 322 may be absorbed by the gases in the multi-pass gas cell 300, while the remainder of the light 322 may be output via the optical output opening 320.

In the example shown in FIG. 3, the reflectors 324 are curved reflectors (e.g., cylindrical or spherical mirrors) that are formed in the sidewalls 312 of the device layer 304. For example, the curved reflectors 324 may be fabricated by printing the profile of the curved reflectors 324 into the lithography mask used for etching of the substrate 302. By using the same lithography mask to fabricate both the reflectors 324 and the bottom surface 310 and sidewalls 312 of the multi-pass gas cell 300, various degrees of freedom may be introduced into the design of the multi-pass gas cell to enhance the throughput, maximum input angle, and total optical path length. For example, the number of reflectors 324, the size of the reflectors 324, and the profile of the reflectors 324 may be controlled by the lithography and etching process. In addition, the fabrication of the multi-pass gas cell 300 by lithographic patterning produces reflectors 324 that are self-aligned and monolithically integrated on the substrate 302.

The curved reflectors 324, sidewalls 312, bottom surface 310 and top surface may be coated with a reflective material, such as a metal or a dielectric coated metal. For example, the reflective material may include aluminum, silver, or gold. As another example, the reflective material may include, for example, SiO$_2$, Si$_3$N$_4$, or other suitable dielectric material deposited on a metal layer (e.g., silver). In addition, more than one dielectric layer may be used for reflection enhancement.

Figure 4:
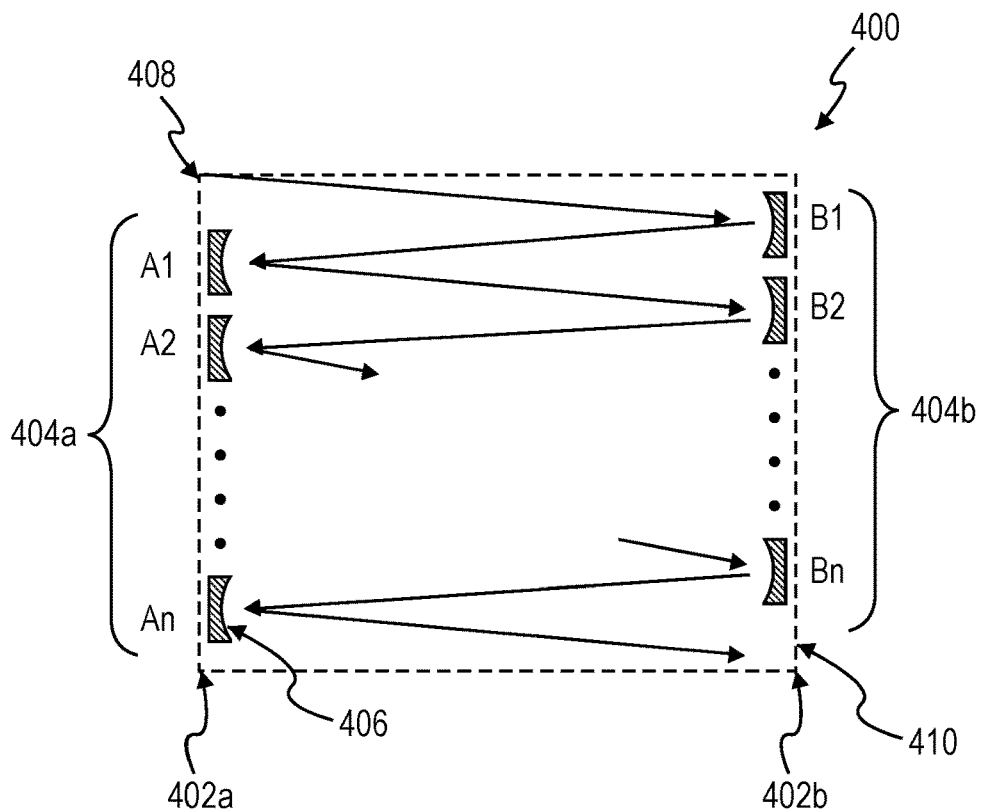
FIG. 4 is a diagram illustrating an example of a reflector design in a rectangular multi-pass gas cell according to some aspects.

FIG. 4 is a diagram illustrating an example of a reflector design in a rectangular multi-pass gas cell 400 according to some aspects. The reflector design of FIG. 4 is a one-dimensional design including two parallel arrays 404a and 404b of curved reflectors 406. In some examples, each of the curved reflectors 406 may be a curved mirror, such as a metallic mirror or Bragg mirror. A first array 404a of curved reflectors 406 (e.g., A1, A2, . . . , An) is positioned along a first side 402a of the multi-pass gas cell 400 and a second array 404b of curved reflectors 406 (e.g., B1, B2, . . . , Bn) is positioned along a second side 402b of the multi-pass gas cell 400. The second side 402b is shown opposite to the first side 402a. The first array 404a of curved reflectors 406 is further offset with respect to the second array 404b of curved reflectors 406. Thus, each of the curved reflectors 406 in the first array 404a is offset with respect to a corresponding curved reflector 406 in the second array 404b.

Light may enter the multi-pass gas cell 400 at an optical input 408 on the first side 402a of the gas cell 400, where the light is directed towards curved reflector B1 in the second array 404b. Curved reflector B1 may then reflect the light back towards curved reflector A1 in the first array 404a. The light continues to be reflected between the first array 404a and the second array 404b multiple times up and down the gas cell 400 (e.g., multiple passes within the gas cell 400) until the light is finally reflected from the last curved reflector An in the first array 404a towards an optical output 410 on the second side 402b of the multi-pass gas cell 400. In some examples, with knowledge of the input light divergence angle, total absorption length to be achieved, and cell area of the multi-pass gas cell 400, the number of curved reflectors 406, the radius of curvature of the curved reflectors 406 and the diameter of the curved reflectors 406 in the reflector design shown in FIG. 4 may be calculated to minimize the insertion loss of the multi-pass gas cell 400.

Figure 5:
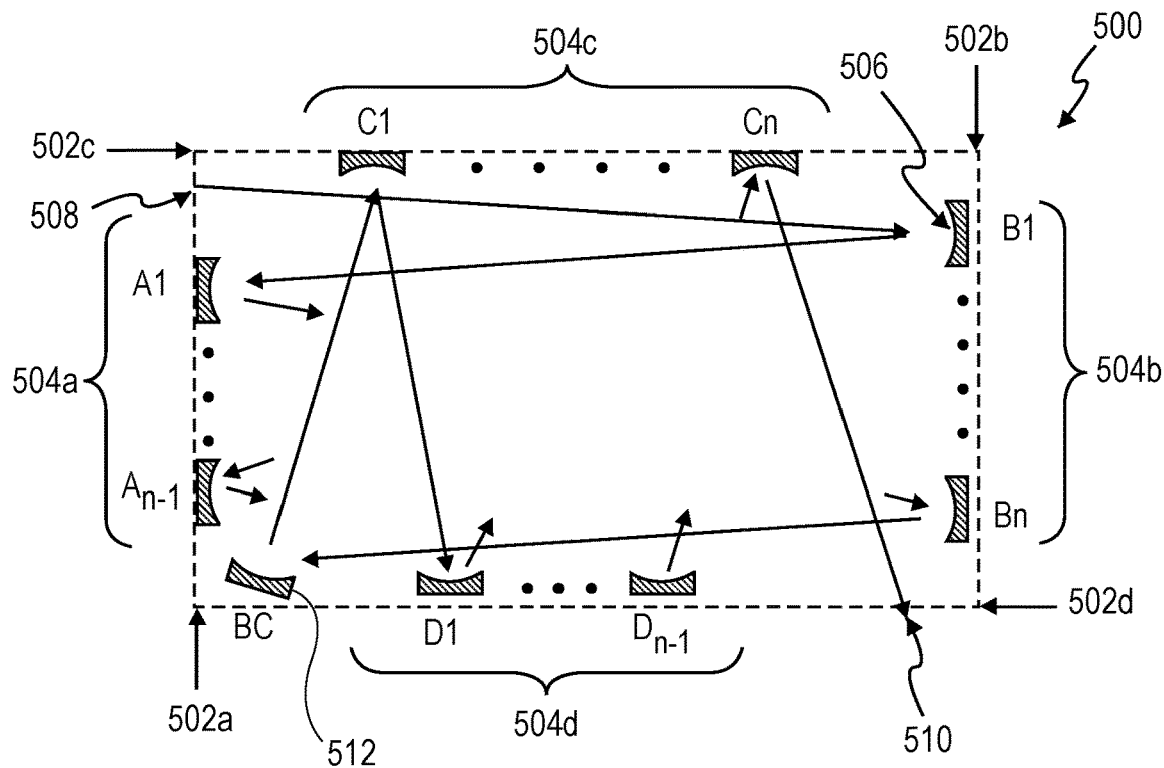
FIG. 5 is a diagram illustrating another example of a reflector design in a rectangular multi-pass gas cell according to some aspects.

FIG. 5 is a diagram illustrating another example of a reflector design in a rectangular multi-pass gas cell 500 according to some aspects. The reflector design of FIG. 5 is a two-dimensional design including four arrays 504a, 504b, 504c, and 504d of curved reflectors 506. In some examples, each of the curved reflectors 506 may be a curved mirror, such as a metallic mirror or Bragg mirror. A first array 504a of curved reflectors 506 (e.g., A1, A2, . . . , A$_{n-1}$) is positioned along a first side 502a of the multi-pass gas cell 500, a second array 504b of curved reflectors 506 (e.g., B1, B2, . . . , Bn) is positioned along a second side 502b of the multi-pass gas cell 500, a third array 504c of curved reflectors 506 (e.g., C1, C2, . . . , Cn) is positioned along a third side 502c of the multi-pass gas cell 500, and a fourth array 504d of curved reflectors 506 (e.g., D1, D2, . . . , D$_{n-1}$) is positioned along a fourth side 502d of the multi-pass gas cell 500. The second side 502b is shown opposite to the first side 502a and the fourth side 502d is shown opposite the third side 502c. The first array 504a and the second array 504b form a first pair of curved reflector arrays, while the third array 504c and the fourth array 504d form a second pair of curved reflector arrays. The first pair of curved reflector arrays 504a/504b is perpendicular to the second pair of curved reflector arrays 504c/504d.

The first array 504a of curved reflectors 506 is further offset with respect to the second array 504b of curved reflectors 506. In addition, the third array 504c of curved reflectors 506 is offset with respect to the fourth array 504d of curved reflectors 506. Thus, each of the curved reflectors 506 in the first array 504a is offset with respect to a corresponding curved reflector 506 in the second array 504b and each of the curved reflectors 506 in the third array 504c is offset with respect to a corresponding curved reflector 506 in the fourth array 504d. There is one fewer curved reflector in each of the first and fourth arrays 504a and 504d for coupling between the pairs of curved reflector arrays.

Light may enter the multi-pass gas cell 500 at an optical input 508 on the first side 502a of the gas cell 500, where the light is directed towards curved reflector B1 in the second array 504b. Curved reflector B1 may then reflect the light back towards curved reflector A1 in the first array 504a. The light continues to be reflected between the first array 504a and the second array 504b multiple times up and down the gas cell 500 (e.g., multiple passes within the gas cell 500) until the light is finally reflected from the last curved reflector Bn in the second array 504b of curved reflectors 506 towards a tilted reflector 512 (e.g., a tilted mirror). The tilted reflector 512 may be a curved reflector optically coupled to direct the light from the first pair of curved reflector arrays 504a/504b to the second pair of curved reflector arrays 504c/504d. For example, the tilted reflector 512 may reflect the light towards curved reflector C1 in the third array 504c. Curved reflector C1 may then reflect the light back towards curved reflector D1 in the fourth array 504d. The light continues to be reflected between the third array 504c and the fourth array 504d multiple times up and down the gas cell 500 (e.g., multiple passes within the gas cell 500) until the light is finally reflected from the last curved reflector Cn in the third array 504c towards an optical output 510 on the fourth side 502d of the multi-pass gas cell 500.

FIG. 6 is a diagram illustrating another example of a reflector design in a rectangular multi-pass gas cell 600 according to some aspects. The reflector design of FIG. 6 is a White gas cell design included a plurality (e.g., two or more) cascaded White multi-pass gas cell structures 602a, 602b, . . . , 602N. Each White multi-pass gas cell structure 602a-602N includes a set of three reflectors 604, 606, and 608. In the example shown in FIG. 6, each reflector 604, 606, and 608 is a spherical mirror. Each of the spherical mirrors 604, 606, and 608 has the same radius of curvature that is equal to the separation (distance) between a larger spherical mirror 608 on one side of a White multi-pass gas cell structure (e.g., structure 602a) and two smaller spherical mirrors 604 and 606 on the other side of the White multi-pass gas cell structure 602a. For example, spherical mirror 608 may have a length that is greater than the respective lengths of either of spherical mirrors 604 and 606. As an example, the longer spherical mirror 608 may have a length that is slightly less than twice the length of either of the shorter mirrors 604 and 606. In addition, spherical mirrors 604 and 606 may be tilted with respect to one another to provide a small angle between the mirrors 604 and 606 selected to maintain the light within the multi-pass gas cell structure 602a. In some examples, the angle between the mirrors 604 and 606 may range between one and five degrees.

The number of passes within each White multi-pass gas cell structure 602a-602N may be determined by the orientation of one of the mirrors 604, 606, or 608. The cell loss may be sensitive to the input angle alignment, and the sensitivity may increase with increasing numbers of passes. In order to mitigate this effect, multiple White multi-pass gas cell structures 602a-602N may be cascaded together, as shown in FIG. 6, with each gas cell structure 602a-602N implementing a small number of passes. This leads to a multi-pass gas cell 600 with a large number of passes, but with less sensitivity to the input.

For example, light may enter the multi-pass gas cell 600 at an optical input 610 to the first White multi-pass gas cell structure 602a, where the light is directed towards small spherical mirror 604. Small spherical mirror 604 may then reflect the light towards the large spherical mirror 608, which then reflects the light towards the other small spherical mirror 606. The light may then be reflected between the large spherical mirror 608 and the small spherical mirrors 604 and 606 one or more times (e.g., where the number of passes is small) until the light is reflected from the small spherical mirror 606 in the first White multi-pass gas cell structure 602a to another small spherical mirror 604 in the second White multi-pass gas cell structure 602b. The light continues to be reflected through the White multi-pass gas cell structures 602b-602N until the light is reflected from the last small spherical mirror in the last White multi-pass gas cell structure 602N towards an optical output 612 of the White multi-pass gas cell 600.

FIGS. 7A and 7B are diagrams illustrating examples of reflector designs in circular multi-pass gas cells 700a and 700b according to some aspects. In the example shown in FIG. 7A, the circular multi-pass gas cell 700a includes a concentric array 702 of curved reflectors 704 (e.g., curved mirrors). Each of the curved mirrors 704 may be a cylindrical mirror. In some examples, an aspherical mirror profile may be used to reduce aberrations due to multiple imaging (multiple passes) using the mirrors 704. In some examples, the curved mirrors 704 may be metallic mirrors or silicon/air Bragg mirrors.

In the example shown in FIG. 7B, the circular multi-pass gas cell 700b includes a one-piece circular reflector (e.g., circular mirror) forming the circular multi-pass gas cell 700b. In some examples, the one-piece circular mirror 710 may be a one-piece circular metallized mirror or a one-piece circular Bragg mirror. In each of FIGS. 7A and 7B, the optical input and optical output are located within a same opening 712 of the circular multi-pass gas cell 700a and 700b. However, a spatial orientation of the optical input is different than a spatial orientation of the optical output, such that input light 706 enters the circular multi-pass gas cell 700a/700b at a different angle than output light 708 exits the circular multi-pass gas cell 700a/700b to prevent cross-coupling between the input light 706 and the output light 708.

Figure 8:
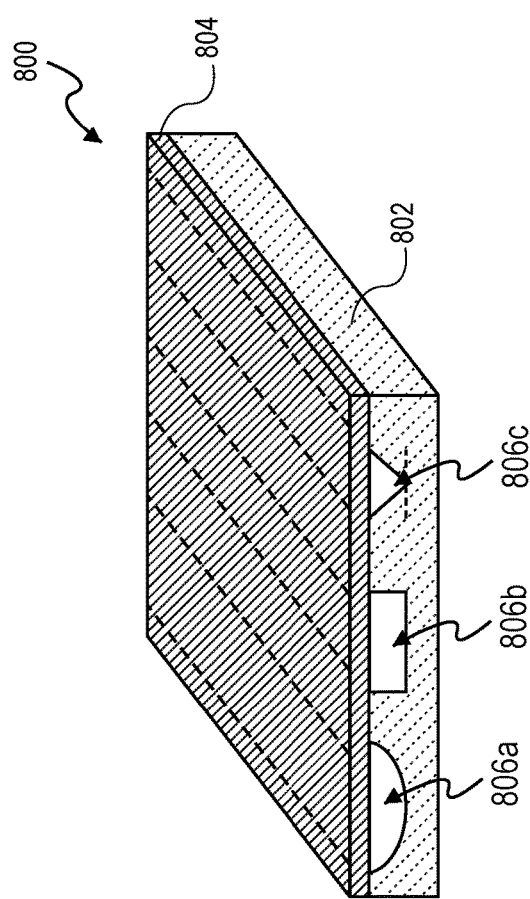
FIG. 8 is a diagram illustrating example waveguide shapes of a hollow waveguide gas cell in accordance with some aspects.

FIG. 8 is a diagram illustrating example waveguide shapes of a hollow waveguide gas cell 800 in accordance with some aspects. The hollow waveguide gas cell 800 is formed in a substrate 802 (e.g., a silicon or SOI substrate). A capping layer 804 is attached to the substrate 802. The capping layer 804 may be, for example, another substrate or a glass substrate. The hollow waveguide gas cell 800 may be fabricated by etching grooves in the substrate 802 to form a waveguide pattern. The cross-section profile of the waveguide pattern may have a circular or semi-circular shape 806a, a rectangular shape 806b, or a V-shape 806c. A waveguide pattern including circular or semi-circular cross-section grooves 806a may be formed, for example, using isotropic etching. A waveguide pattern including rectangular cross-section grooves 806b may be formed, for example, using DRIE. A waveguide pattern including V-shaped cross-section grooves 806c may be formed, for example, using anisotropic wet etching on the 1-0-0 plane. After etching, a metallization may be applied to the sidewalls and floors of the hollow waveguide. Here, the floors of the hollow waveguide correspond to the bottom surface of the gas cell 800.

A ceiling of the waveguide is implemented using an interior surface of the capping layer 804. Here, the ceiling of the waveguide includes the top surface of the gas cell 800. In some examples, the ceiling of the waveguide is devoid of any pattern. In other examples, a replica of the waveguide pattern formed in the substrate 802 is etched on the interior surface of the capping layer 804 to increase the height of the waveguide, thus enhancing the waveguide throughput.

The waveguide pattern of the hollow waveguide gas cell 800 may be formed of elementary segments, such as straight line segments or torus segments. From these elementary segments, different waveguide pattern shapes may be formed. In selecting the shape for the waveguide pattern, consideration may be given to the maximum filling area in the gas cell 800, along with minimization of the insertion loss in the gas cell 800. Connections between the segments may be, for example, circular toruses, corner cube mirrors, or other suitable optical connectors.

Figure 9B:
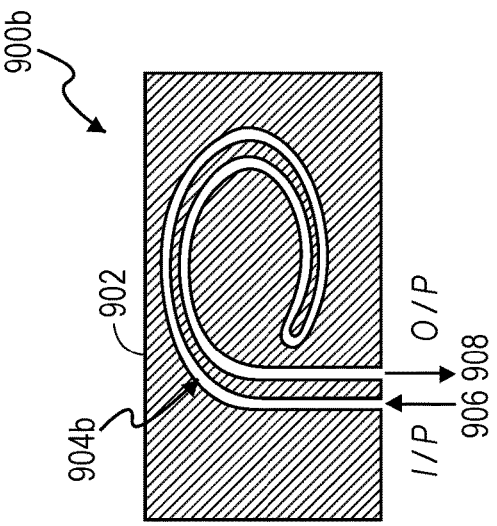
FIGS. 9A and 9B are diagrams illustrating examples of different waveguide patterns that may be used in hollow waveguide gas cells, according to some aspects.
Figure 9A:
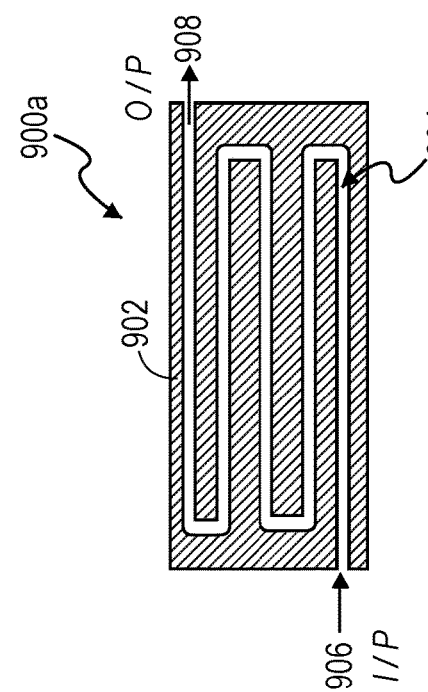

FIGS. 9A and 9B are diagrams illustrating examples of different waveguide patterns that may be used in hollow waveguide gas cells 900a and 900b, according to some aspects. In the example shown in FIG. 9A, the waveguide pattern 904a of the hollow waveguide gas cell 900a includes an array of horizontal straight line segments (horizontal waveguides) in a zig-zag pattern formed in a substrate 902. An optical input 906 directs light into a first one of the horizontal waveguides. The light then travels through each of the horizontal waveguides in the zig-zag waveguide pattern 904a until reaching an optical output 908 at a last one of the horizontal waveguides.

In the example shown in FIG. 9B, the waveguide pattern 904b of the hollow waveguide gas cell 900b has a spiral shape formed of straight line segments and torus segments. Light enters the optical input 906 and traverses the spiral-shaped waveguide pattern 904b until exiting at the optical output 908. In the example shown in FIG. 9B, the optical input 906 and optical output 908 may be formed on the same side of the hollow waveguide gas cell 900b.

Figure 10:
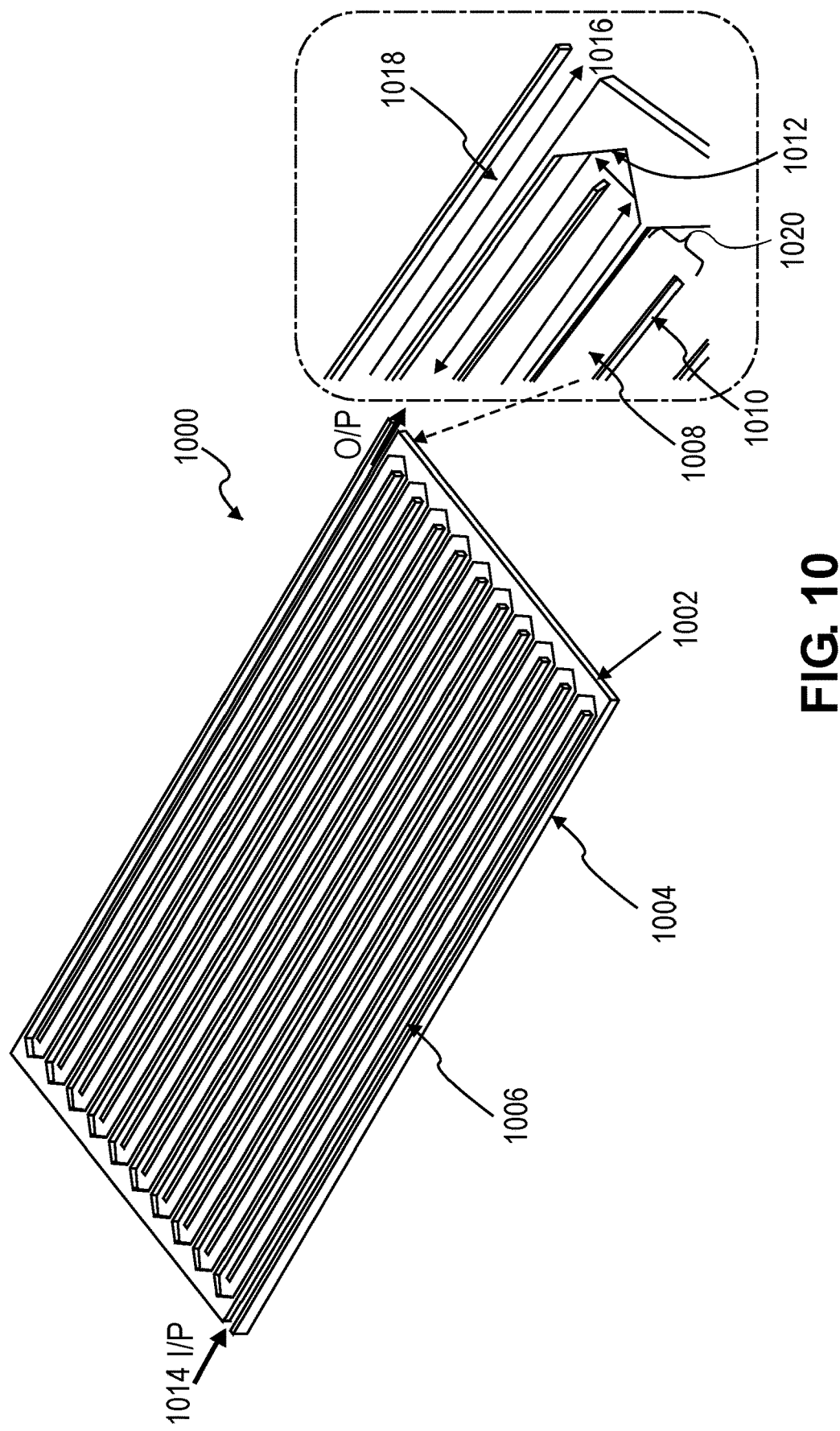
FIG. 10 is a diagram illustrating an example of a hollow waveguide gas cell in accordance with some aspects.

FIG. 10 is a diagram illustrating an example of a hollow waveguide gas cell 1000 in accordance with some aspects. The hollow waveguide gas cell 1000 includes a hollow waveguide 1004 formed in a substrate 1002 (e.g., a silicon or SOI substrate). The hollow waveguide 1004 is characterized by a waveguide pattern 1006 defining a light path of light 1018 propagating in the gas cell 1000 between an optical input 1014 and an optical output 1016. In the example shown in FIG. 10, the waveguide pattern 1006 includes an array of horizontal waveguides 1020. Each horizontal waveguide 1020 is defined by two sidewalls 1010 on either side of a bottom surface 1008 etched in the substrate 1002. Thus, the waveguide pattern 1006 is formed by the sidewalls 1010 surrounding the etched bottom surface 1008. The horizontal waveguides 1020 are optically coupled to one another via respective corner cube mirrors 1012. The resulting waveguide pattern 1006 is a zig-zag pattern of the horizontal waveguides 1020 optically coupled at their ends with the corner cube mirrors 1012.

The light at the optical output 1016 may have a small divergence angle $\theta_d$ and random polarization. The light travelling in the horizontal waveguides 1020 is guided laterally by the sidewalls 1010 with an incidence angle on the sidewalls 1010 with respect to the normal surface between 0 and $90-\theta_d$. A similar incidence angle may be experienced by the light on the bottom surface 1008 and top surface (not shown) of the horizontal waveguides 1020. However, at the optical connection between the horizontal waveguides (e.g., the corner cube mirrors 1012), the incidence angle may range from $45-\theta_d$ to $90+\theta_d$. Therefore, the corner cube mirrors 1012 may have a different reflection coefficient than the sidewalls 1010 and the bottom surface 1008, which may result in a different reflective coating being applied to the corner cube mirrors 1012 than the sidewalls 1010 and bottom surface 1008. For example, the bottom surface 1008 and sidewalls 1010 (and top surface formed by the capping layer) may be metallized with silver and coated with $TiO_2$ to improve the performance of hollow waveguides 1004 having a length less than 0.7 meters as compared to hollow waveguides 1004 coated with only silver. However, for the corner cube mirrors 1012 and other surfaces where the light 1018 impinges with an angle of 45 degrees, one layer of dielectric may not be sufficient. Therefore, in some examples, the corner cube mirrors 1012 may be metallized with silver and coated with both $TiO_2$ and $SiO_2$ to enhance the insertion loss of the hollow waveguide 1004.

Figure 11:
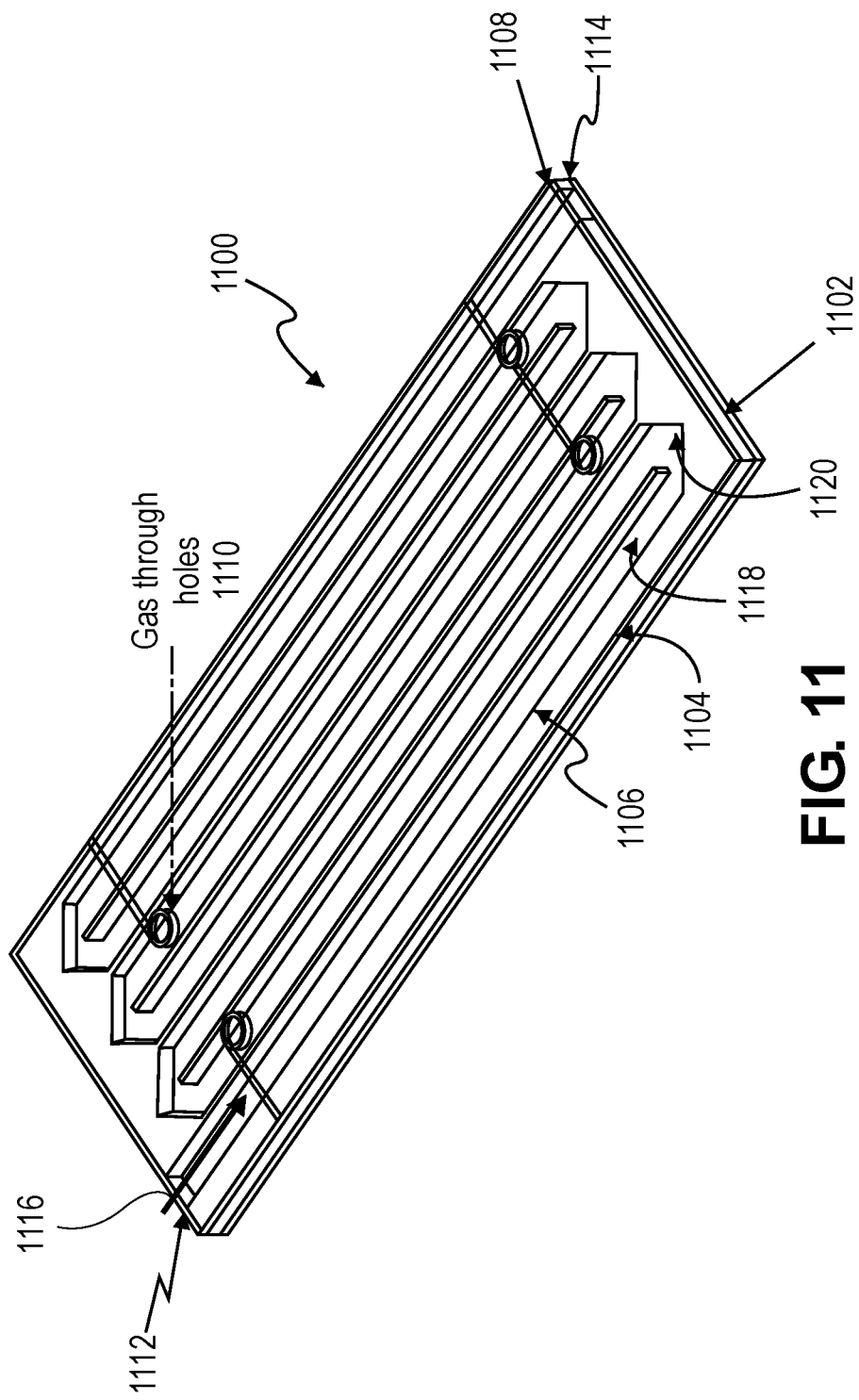
FIG. 11 is a diagram illustrating another example of a hollow waveguide gas cell in accordance with some aspects.

FIG. 11 is a diagram illustrating another example of a hollow waveguide gas cell 1100 in accordance with some aspects. The hollow waveguide gas cell 1100 includes a hollow waveguide 1104 formed in a substrate 1102 (e.g., a silicon or SOI substrate). A capping layer 1108 is attached to the substrate 1102 to seal the hollow waveguide gas cell 1100 on the top. The capping layer 1108 is illustrated as transparent in FIG. 11 to expose the inner structure of the hollow waveguide gas cell 1100.

The hollow waveguide 1104 is characterized by a waveguide pattern 1106 defining a light path of light 1116 propagating in the gas cell 1100 between an optical input 1112 and an optical output 1114. In the example shown in FIG. 11, the waveguide pattern 1106 includes an array of horizontal waveguides 1118 optically coupled to one another via respective corner cube mirrors 1120. The resulting waveguide pattern 1106 is a zig-zag pattern of the horizontal waveguides 1118 optically coupled at their ends with the corner cube mirrors 1120. An interior surface of the capping layer 1108 forms the top surface (ceiling) of the hollow waveguide 1104. The capping layer 1108 further includes a plurality of through-holes 1110 for gas or other fluid injection into and out of the hollow waveguide gas cell 1100.

FIGS. 12A and 12B are diagrams illustrating an example of a hollow waveguide 1200 including sidewalls formed of Bragg mirrors according to some aspects. FIG. 12A is a top view of the hollow waveguide 1200, and FIG. 12B is a cross-sectional view of the hollow waveguide 1200. The hollow waveguide 1200 may correspond, for example, to any of the horizontal waveguides 1020 or 1118 shown in FIG. 10 or 11.

The horizontal waveguide 1200 may be formed in a substrate 1202 (e.g., a silicon or SOI substrate) by etching the substrate 1202 to form the bottom surface 1204 of the hollow waveguide 1200 and the Bragg mirror sidewalls 1206a and 1206b. For example, the Bragg mirror sidewalls 1206a and 1206 may include successive layers of silicon/air pairs. A capping layer 1210 may be bonded to the substrate 1202 and an interior surface 1212 of the capping layer 1210 may form the top surface (or ceiling) of the hollow waveguide 1200. Light 1208 may propagate through the hollow waveguide 1200 being guided by the Bragg mirror sidewalls 1206a and 1206b.

In some examples, Bragg mirrors may also be applied to the corner cube mirrors or other optical connectors between the horizontal waveguides 1200 and/or to the bottom surface 1204 and top surface 1212. For the bottom surface 1204 and top surface 1212, Bragg mirrors may be formed by depositing successive layers of silicon and silicon dioxide using, for example, a CVD process.

Although the bandwidth of the Bragg mirror sidewalls 1206a and 1206b may be limited, Bragg mirrors may be useful in certain applications. For example, some of the gases measured in air quality monitoring applications may have an absorption band located around 3.3 µm. The hollow waveguide design may be tuned to the desired wavelength $\lambda_0$ by tuning the thickness of the silicon/air layers to be $(2*m+1)*\lambda_0/(4n)$, where n is the corresponding medium refractive index and m is an integer number. Increasing m may limit the bandwidth of the Bragg mirror, while facilitating the fabrication technology requirements.

Figure 13A:
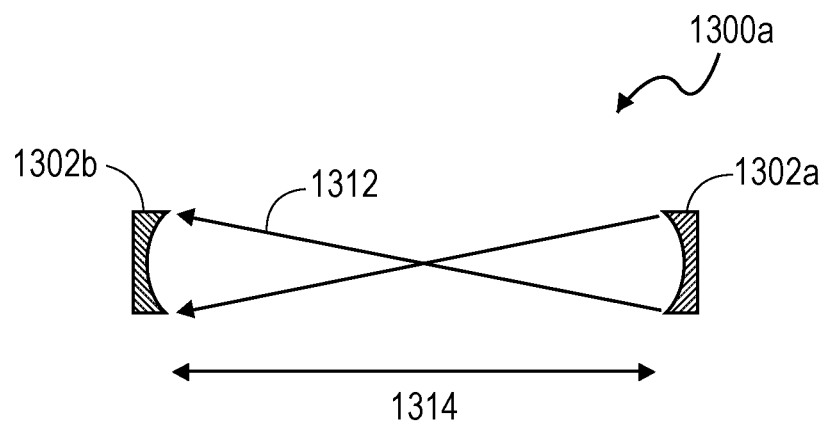
FIGS. 13A-13C are diagrams illustrating examples of light guiding in gas cells according to some aspects.
Figure 13B:
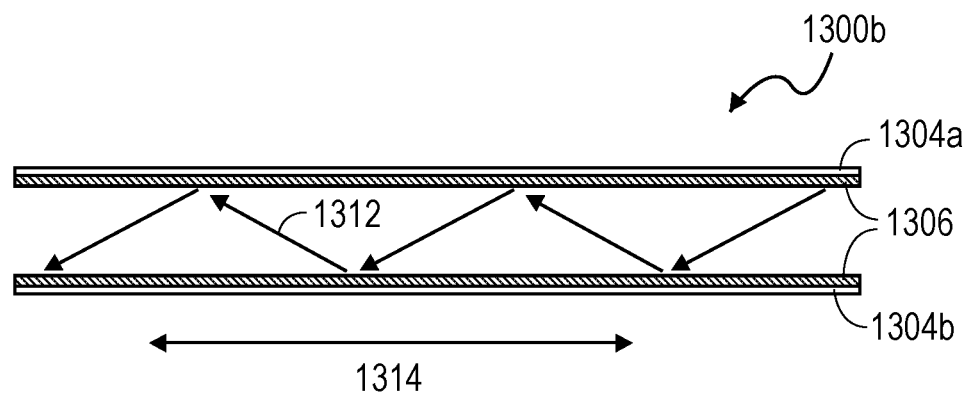
Figure 13C:
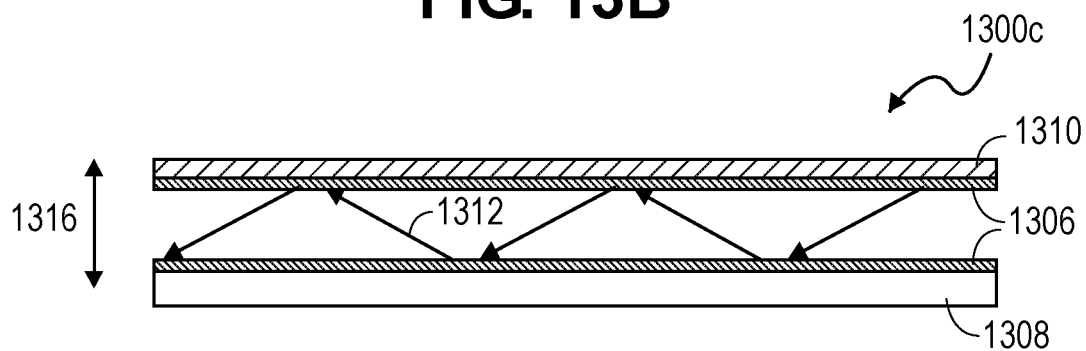

FIGS. 13A-13C are diagrams illustrating examples of light guiding in gas cells according to some aspects. FIG. 13A is a top view of a multi-pass gas cell 1300a including curved reflectors 1302a and 1302b formed into opposing sidewalls of a substrate of the multi-pass gas cell 1300a. Light 1312 may be guided in the multi-pass gas cell 1300a in an in-plane direction 1314 (e.g., in the plane parallel to the substrate, which corresponds to an in-plane axis of the gas cell 1300a) using the curved reflectors 1302a and 1302b.

FIG. 13B is top view of a hollow waveguide gas cell 1300b including sidewalls 1304a and 1304b of a hollow waveguide formed in the substrate of the hollow waveguide gas cell 1300b. In the example shown in FIG. 13B, the sidewalls 1304a and 1304b include a reflective material 1306 (e.g., a metal or dielectric coated metal) coated thereon. In other examples, the sidewalls 1304a and 1304b may include Bragg mirrors. The light 1312 may be guided in the hollow waveguide gas cell 1300b in the in-plane direction 1314 using the reflective sidewalls 1304a/1306 and 1304b/1306.

FIG. 13C is a cross sectional view of a gas cell 1300c, which may be a multi-pass gas cell or a hollow waveguide gas cell. The gas cell 1300c is formed in a substrate 1308 and sealed by a capping layer 1310. In the example shown in FIG. 13C, a bottom surface of the gas cell 1300c formed in the substrate 1308 and a top surface of the gas cell formed by the capping layer 1310 may each be coated with a reflective material 1306 (e.g., a metal or dielectric coated metal). In other examples, the bottom surface and/or top surface may include Bragg mirrors. The light 1312 may be guided in the gas cell 1300c in an out-of-plane direction 1316 (e.g., in the plane perpendicular to the substrate 1308) using the reflective material 1306 (or Bragg mirrors) on the bottom and top surfaces.

Figure 14:
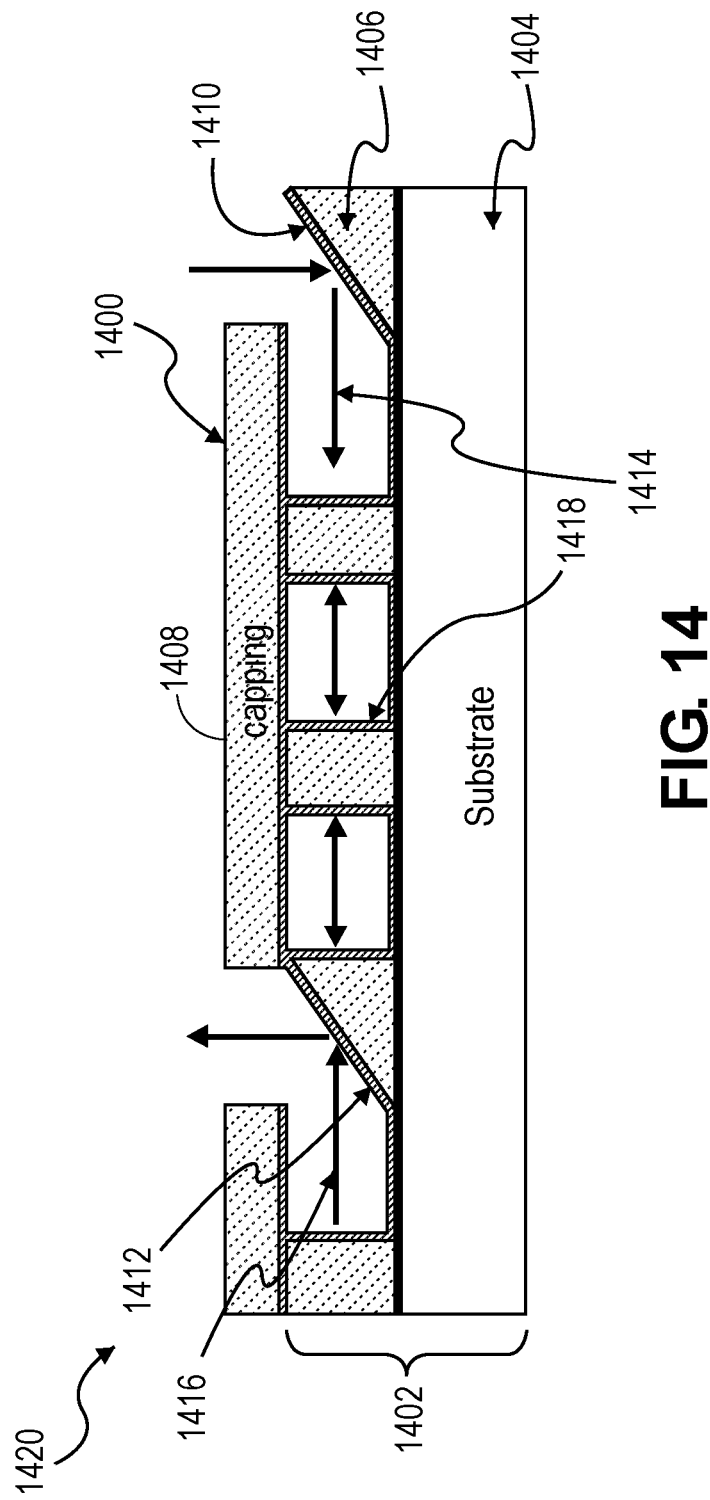
FIG. 14 is a diagram illustrating an example of a gas cell including optical components for coupling light into and out of the gas cell in an out-of-plane direction according to some aspects.

FIG. 14 is a diagram illustrating an example of a gas cell 1400 including optical components for coupling light into and out of the gas cell 1400 in an out-of-plane direction according to some aspects. In the example shown in FIG. 14, the gas cell 1400 is a hollow waveguide gas cell. However, it should be understood that out-of-plane light coupling may be also be used in a multi-pass gas cell.

The gas cell 1400 is shown formed in a substrate 1402 (e.g., a silicon or SOI substrate). The substrate 1402 may include a device layer 1406 and a handle layer 1404. The gas cell 1400 may be formed, for example, in the device layer 1406 of the substrate 1402. A capping layer 1408 is bonded to the device layer 1406 to seal the gas cell 1400 on the top. The bottom surface and sidewalls of the gas cell 1400 formed in the device layer 1406, along with the interior surface of the capping layer 1408 may each be coated with a reflective material 1418 (e.g., metal or dielectric coated metal).

The gas cell 1400 may further be integrated on a die 1420 that includes an input optical component 1410 at an optical input of the gas cell 1400 and an output optical component 1412 at an optical output of the gas cell 1400. The input optical component 1410 and output optical component 1412 may each be, for example, inclined mirrors (e.g., 45 degree mirrors) formed in the device layer 1406. The inclined mirrors 1410 and 1412 may be formed, for example, using anisotropic wet etching on the 1-0-0 plane of the silicon wafer and metallization of the inclined mirrors 1410 and 1412 with the reflective material 1418. The input optical component 1410 is optically coupled to redirect input light 1414 received, for example, from the top of the die 1420, from an out-of-plane direction to an in-plane direction for input to the gas cell 1400. In addition, the output optical component 1412 is optically coupled to redirect output light 1416 from the gas cell 1400 from the in-plane direction to the out-of-plane direction.

Figure 15:
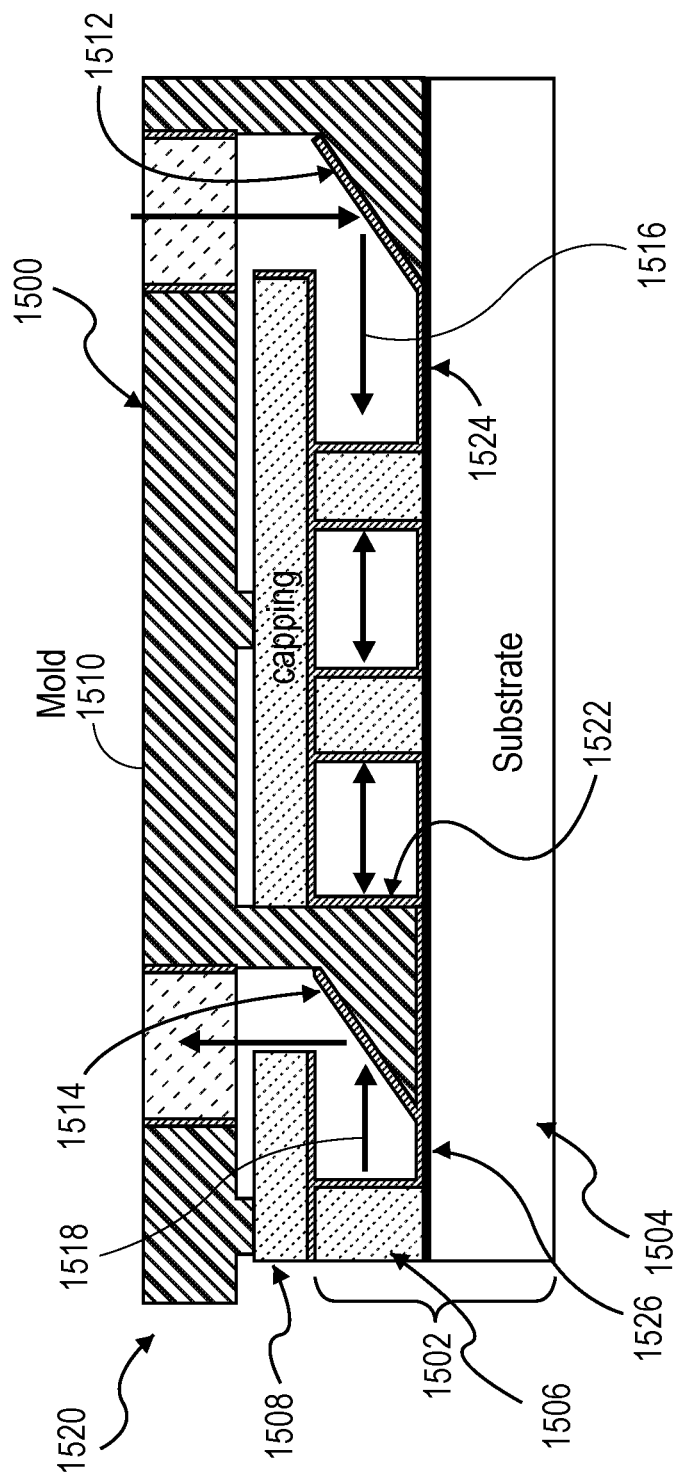
FIG. 15 is a diagram illustrating another example of a gas cell including optical components for coupling light into and out of the gas cell in an out-of-plane direction according to some aspects.

FIG. 15 is a diagram illustrating another example of a gas cell 1500 including optical components for coupling light into and out of the gas cell 1500 in an out-of-plane direction according to some aspects. In the example shown in FIG. 15, the gas cell 1500 is a hollow waveguide gas cell. However, it should be understood that out-of-plane light coupling may be also be used in a multi-pass gas cell.

The gas cell 1500 is shown formed in a substrate 1502 (e.g., a silicon or SOI substrate). The substrate 1502 may include a device layer 1506 and a handle layer 1504. The gas cell 1500 may be formed, for example, in the device layer 1506 of the substrate 1502. A capping layer 1508 is bonded to the device layer 1506 to seal the gas cell 1500 on the top. The bottom surface and sidewalls of the gas cell 1500 formed in the device layer 1506, along with the interior surface of the capping layer 1508 may each be coated with a reflective material 1522 (e.g., metal or dielectric coated metal).

The gas cell 1500 may further be integrated on a die 1520 that includes a mold 1510 attached to the capping layer 1508 and the substrate 1502. The mold 1510 may be formed of plastic and precisely fabricated to align with the die 1520. The mold 1510 includes an input optical component 1512 and an output optical component 1514 that may be attached to the substrate 1502 within respective openings 1524 and 1526 of the device layer 1506 on either side of the gas cell 1500. For example, the input optical component 1512 may be positioned at an optical input of the gas cell 1500 and the output optical component 1514 may be positioned at an optical output of the gas cell 1500. The input optical component 1512 and output optical component 1514 may each be, for example, inclined mirrors (e.g., 45 degree mirrors) coated with the reflective material 1522 (e.g., metal). The input optical component 1512 is optically coupled to redirect input light 1516 received, for example, from the top of the die 1520, from an out-of-plane direction to an in-plane direction for input to the gas cell 1500. In addition, the output optical component 1514 is optically coupled to redirect output light 1518 from the gas cell 1500 from the in-plane direction to the out-of-plane direction.

Figure 16:
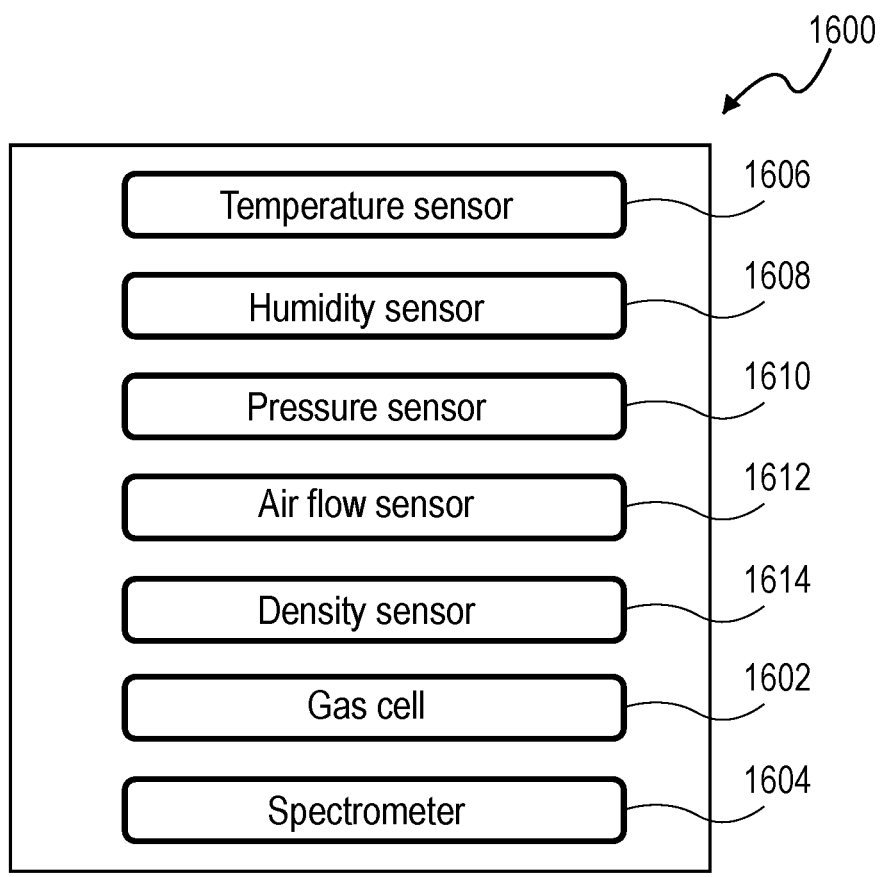
FIG. 16 is a diagram illustrating an example of a die including a gas cell and various other components integrated thereon according to some aspects.

FIG. 16 is a diagram illustrating an example of a die 1600 including a gas cell 1602 and various other components integrated thereon according to some aspects. The gas cell 1602 may correspond to any of the gas cells shown in FIGS. 1-15. The gas cell 1602 may further be optically coupled on the die 1600 to a spectrometer 1604, such as a MEMS spectrometer, to produce an interferogram representative of the output light from the gas cell 1602. The die 1600 may further include one or more sensors for measuring various parameters associated with the gas cell 1602. For example, the die 1600 may include a temperature sensor 1606, a humidity sensor 1608, a pressure sensor 1610, an air flow sensor 1612, a density sensor 1614, and/or other sensors depending on the types of parameters to be measured. The spectrometer 1604 and other sensors 1606-1614 may be integrated, for example, on the device layer, handle layer, or capping layer of the die 1600.

Figure 17A:
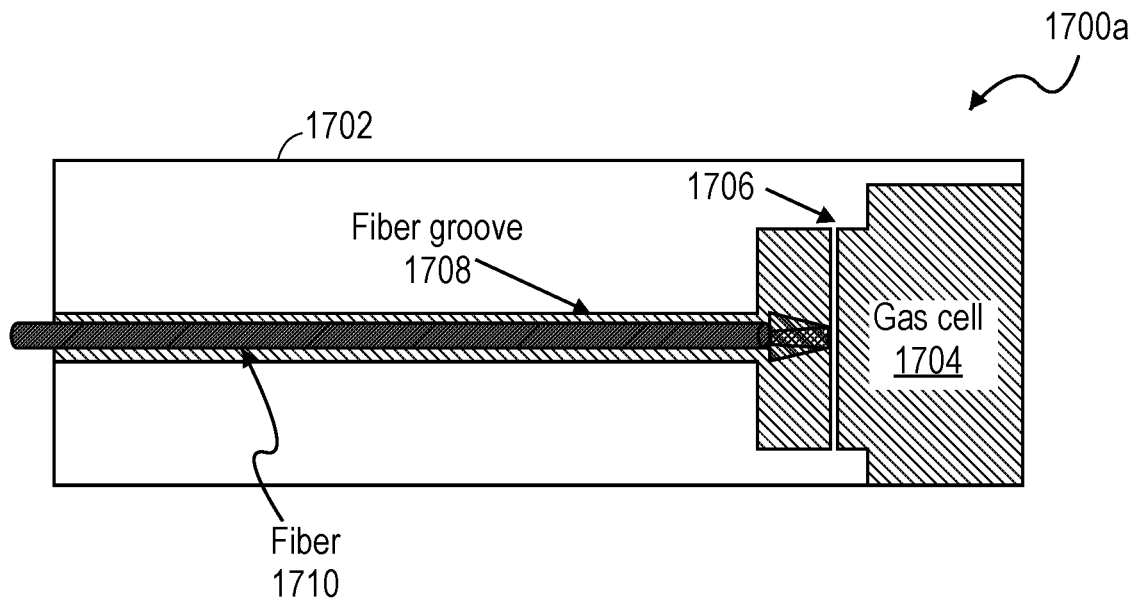
FIGS. 17A and 17B are diagrams illustrating examples of dies including a gas cell and a pressure sensor integrated thereon according to some aspects.
Figure 17B:
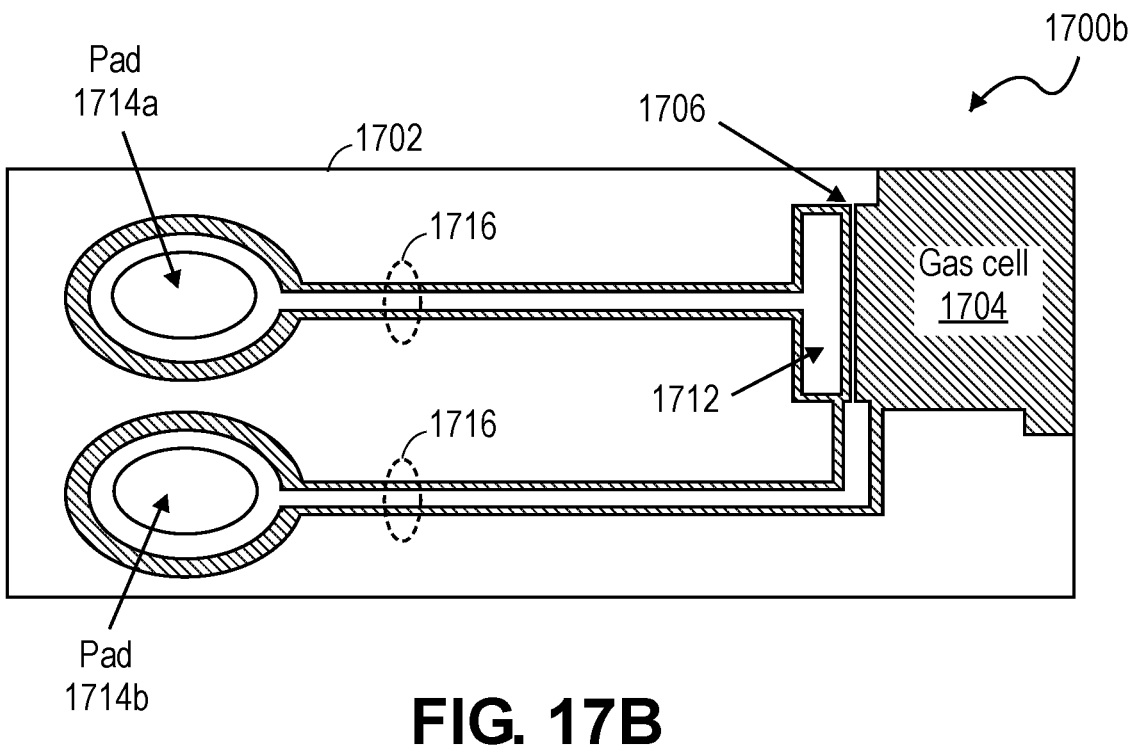

FIGS. 17A and 17B are diagrams illustrating examples of dies 1700a and 1700b including a gas cell 1704 and a pressure sensor integrated thereon according to some aspects. The dies 1700a and 1700b may include a substrate 1702 (e.g., silicon or SOI substrate) within which the gas cell 1704 is formed. The pressure sensor may be formed of vertical membrane 1706 including a first side facing an inside of the gas cell 1704 and a second side facing an outside of the gas cell 1704 (e.g., an ambient). Any pressure difference between the inside of the gas cell and the outside of the gas cell may lead to a deflection of the membrane 1706. The deflection of the membrane 1706 may be detected optically, as shown in FIG. 17A, or electrically (e.g., using capacitive sensing), as shown in FIG. 17B.

For example, as shown in FIG. 17A, to optically detect the membrane deflection, the pressure sensor may include an optical fiber 1710 inserted into a fiber groove 1708 formed in the substrate 1702. The tip of the fiber 1710 adjacent the second side of the membrane 1706 may be metallized to form a Fabry Perot interferometer between the fiber tip and the membrane 1706. The length of the Fabry Perot interferometer may be dependent, for example, on the maximum membrane deflection. By measuring the Fabry Perot free spectral range, the pressure inside the gas cell 1704 may be deduced.

In the example shown in FIG. 17B, to electrically detect the membrane deflection, the pressure sensor may include a first electrode corresponding to the membrane 1706 and a second electrode corresponding to a fixed structure 1712. The capacitance between the two electrodes may be measured using pads 1714a and 1714b on the substrate 1702 electrically coupled to the electrodes via metal tracings 1716 on the substrate 1702. By measuring the variation in capacitance, the pressure inside the gas cell 1704 may be deduced.

Figure 18:
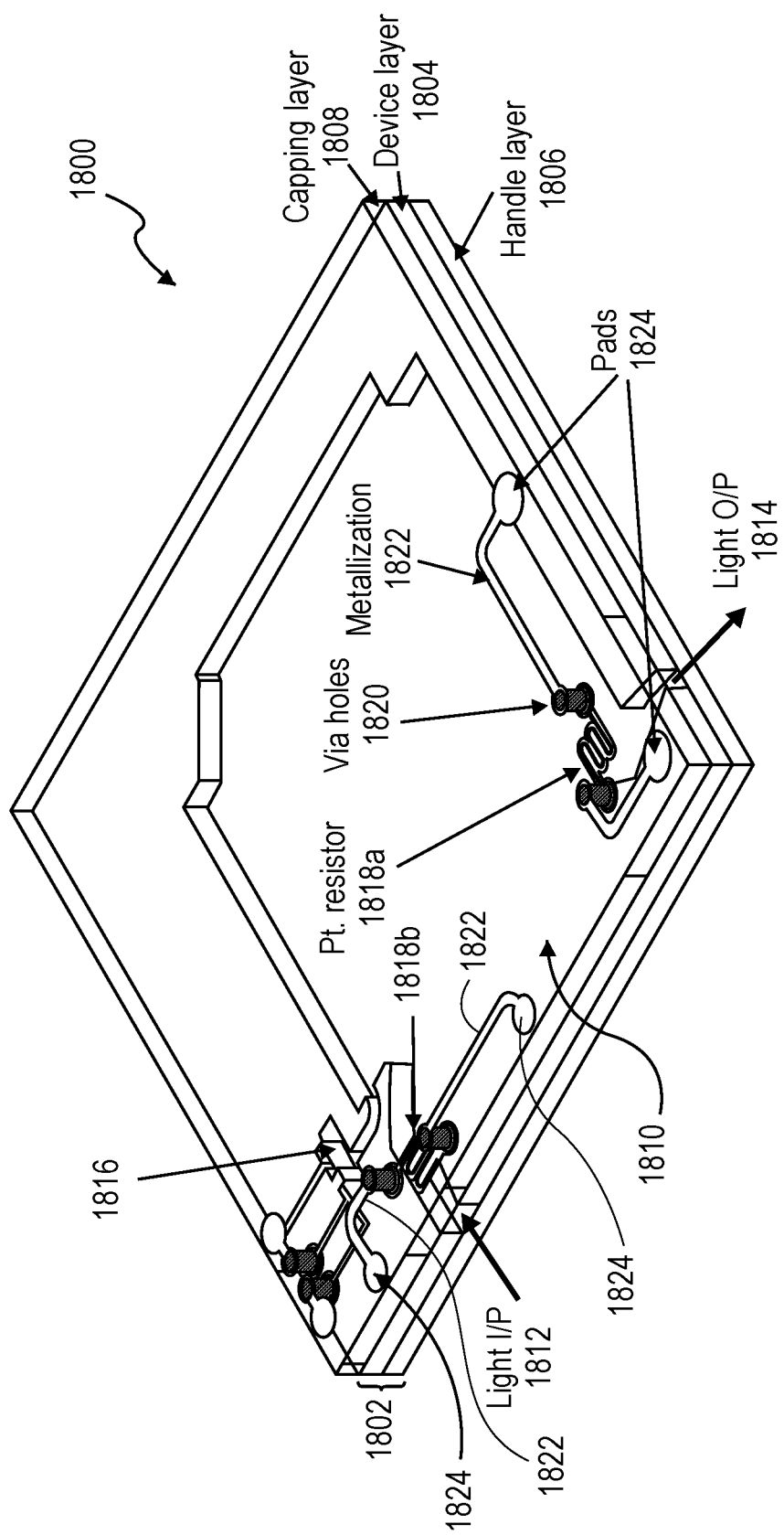
FIG. 18 is a diagram illustrating an example of a die including a gas cell, a pressure sensor, an air flow sensor, and a temperature sensor integrated thereon according to some aspects.

FIG. 18 is a diagram illustrating an example of a die 1800 including a gas cell 1810, a pressure sensor, an air flow sensor, and a temperature sensor integrated thereon according to some aspects. The die 1800 includes a substrate (e.g., a silicon substrate or SOI substrate) including at least a device layer 1804 and a handle layer 1806. The gas cell 1810 is formed in the device layer 1804 of the substrate 1802. In the example shown in FIG. 18, the gas cell 1800 is a multi-pass gas cell, which may include, for example, two pairs of curved mirror arrays (not shown, for simplicity) to reflect light from an optical input 1812 to an optical output 1814 through the volume of the gas cell 1810. A capping layer 1808 is bonded to the device layer 1804 and includes an interior surface forming a top surface of the gas cell 1810. The capping layer 1808 is illustrated as transparent in FIG. 18 to expose the inner structure of the multi-pass gas cell 1810.

The pressure sensor may include a vertical membrane 1816 including a first side facing an inside of the gas cell 1810 and a second side facing an outside of the gas cell 1810. In the example shown in FIG. 18, the vertical membrane 1816 is located in a small chamber directly connected to the gas cell 1810 through a curved waveguide. Deflection of the membrane 1816 represents a pressure difference between the inside and the outside of the gas cell 1810. The pressure difference may be measured either optically or electrically. Both options are illustrated in FIG. 18. For measurement based on capacitive sensing, the electrodes may be connected to the top of the capping layer 1808 using vias that are further connected to the corresponding pads.

The temperature sensor may include at least one resistor (e.g., resistor 1818a). The resistor 1818a may be made of platinum and may be deposited, for example, on the interior surface of the capping layer 1808. The resistance of platinum increases linearly with temperature according to the following relation: $R(T)=R_0(1+\alpha(T-T_0))$, where $R_0$ is the resistance at temperature $T_0$ and $\alpha$ is the temperature coefficient. By using two resistors 1818a and 1818b, one at the optical output and one at the optical input, the temperature gradient across the gas cell 1810 may be measured. From the gradient, the air flow may be measured. Thus, the combination of the two resistors 1818a and 1818b may form the air flow sensor.

In some examples, the bottom surface (e.g., on the handle layer 1806) and sidewalls (e.g., within the device layer 1804) of the gas cell 1810 may be coated with gold. The platinum resistors 1818a and 1818b may be patterned on the interior surface of the capping layer 1808. The remaining portion of the interior surface of the capping layer 1808 may also be coated with gold, except for an unmetallized region between the platinum and the gold to prevent electric shorts. The ends of the resistors 1818a and 1818b may be connected using respective vias to a top (exterior) surface of the capping layer 1808. In some examples, the vias may be hollow to further operate as air inlets/outlets. Metallized tracks 1822 may be deposited on the exterior surface of the capping layer 1808 to connect between the vias and pads 1824 on the exterior surface of the capping layer 1808.

Figure 19:
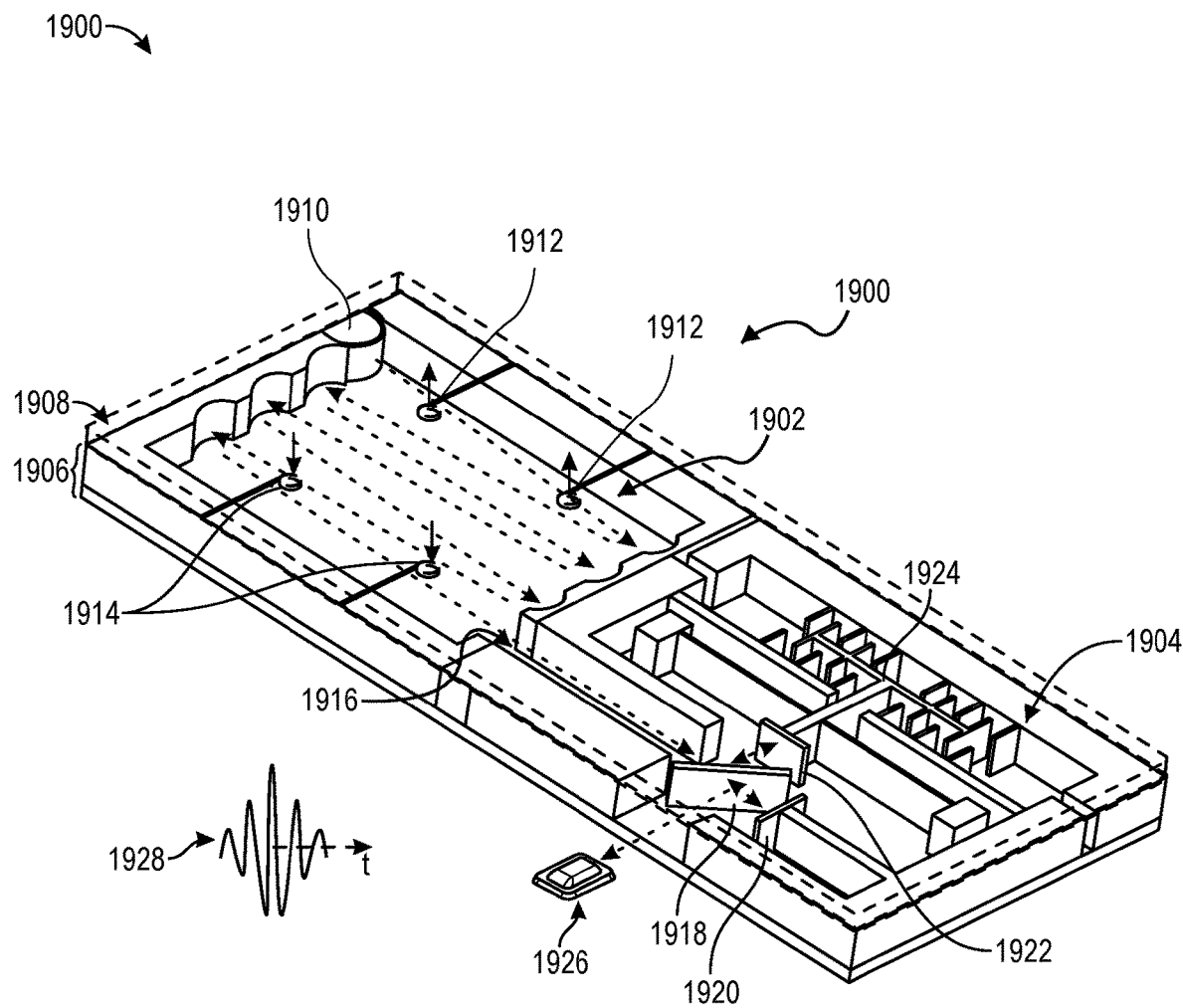
FIG. 19 is a diagram illustrating an example of a die including a gas cell and a spectrometer integrated thereon according to some aspects.

FIG. 19 is a diagram illustrating an example of a die 1900 including a gas cell 1902 and a spectrometer 1904 integrated thereon according to some aspects. In other examples, the gas cell 1902 and spectrometer 1904 may be on separate dies and the light may be guided between the dies using, for example, a mold. In some examples, the gas cell die and spectrometer die may be integrated on a same board.

In the example shown in FIG. 19, the spectrometer 1904 is a MEMS-based Michelson interferometer. However, it should be understood that other spectrometer structures, such as a Mach Zender interferometer or a Fabry Perot interferometer may be used. In addition, the gas cell 1902 shown in FIG. 19 is a multi-pass gas cell. However, it should be understood that, in other examples, the gas cell 1902 may instead be a hollow waveguide gas cell.

The gas cell 1902 and the MEMS spectrometer 1904 are each formed in a substrate 1906 of the die 1900. In some examples, the gas cell 1902 and MEMS spectrometer 1904 may each be fabricated in the device layer of the substrate 1906. A capping layer 1908 may further be bonded to the substrate 1906 to cover the gas cell 1902 and the MEMS spectrometer 1904. Through holes 1912 and 1914 in the capping layer 1908 further form the gas inlets and gas outlets, respectively, in the gas cell 1902.

A light source 1910 may further be integrated on the die 1900. In the example shown in FIG. 19, the light source 1910 forms the optical input of the gas cell 1902. In some examples, the light source 1910 may be a black silicon thermal emitter that is monolithically integrated on the die 1900. Light emitted from the light source 1910 is reflected multiple times up and down the gas cell 1902 through the volume of the gas until the light reaches the optical output 1916 of the gas cell 1902. The optical output 1916 of the gas cell 1902 is directly coupled to the optical input of the MEMS spectrometer 1904.

The MEMS spectrometer 1904 is a Michelson interferometer that includes a beam splitter 1918, a fixed mirror 1920, a moveable mirror 1922, and a MEMS actuator 1924 coupled to the moveable mirror 1922. The beam splitter 1918 may include, for example, an air/silicon beam splitter (e.g., a beam splitter formed at an interface between silicon and air). In the example shown in FIG. 19, the light output from the gas cell 1902 enters the MEMS spectrometer 1904 and impinges the beam splitter 1918, where the light is split into two incident beams. The fixed mirror 1920 is optically coupled to receive one of the incident beams and to reflect the first incident beam back towards the beam splitter 1918 to produce a first reflected beam. The moveable mirror 1922 is optically coupled to receive a second incident beam and to reflect the second incident beam back towards the beam splitter 1918 to produce a second reflected beam. The moveable mirror 1922 is coupled to the MEMS actuator 1924 to produce a desired optical path difference (OPD) between the first and second reflected beams.

In one example, the MEMS actuator 1924 is formed of a comb drive and spring. By applying a voltage to the comb drive, a potential difference results across the actuator 1924, which induces a capacitance therein, causing a driving force to be generated as well as a restoring force from the spring, thereby causing a displacement of moveable mirror 1922 to the desired position for reflection of the second incident beam. An OPD is then created between the first and second reflected beams that is substantially equal to twice the displacement of the moveable mirror 1922.

The reflected beams interfere at the beam splitter 1918, allowing the temporal coherence of the light to be measured at each different OPD produced by the moveable mirror 1922. The beam splitter 1918 is further optically coupled to direct the interference beam resulting from interference between the first reflected beam and the second reflected beam towards a detector 1926. In some examples, the detector 1926 may be integrated on the die 1900 or on a separate die. The detector 1926 is configured to detect an interference signal from the interference beam and to provide the interference signal to a processor (not shown) for processing of the interference signal to extract the corresponding interferogram 1928. Additional processing may be performed using the interferogram for analysis of the gas in the gas cell 1902. For example, the processor may be configured to calculate an absorbance of the gas based on the interferogram.

Figure 20:
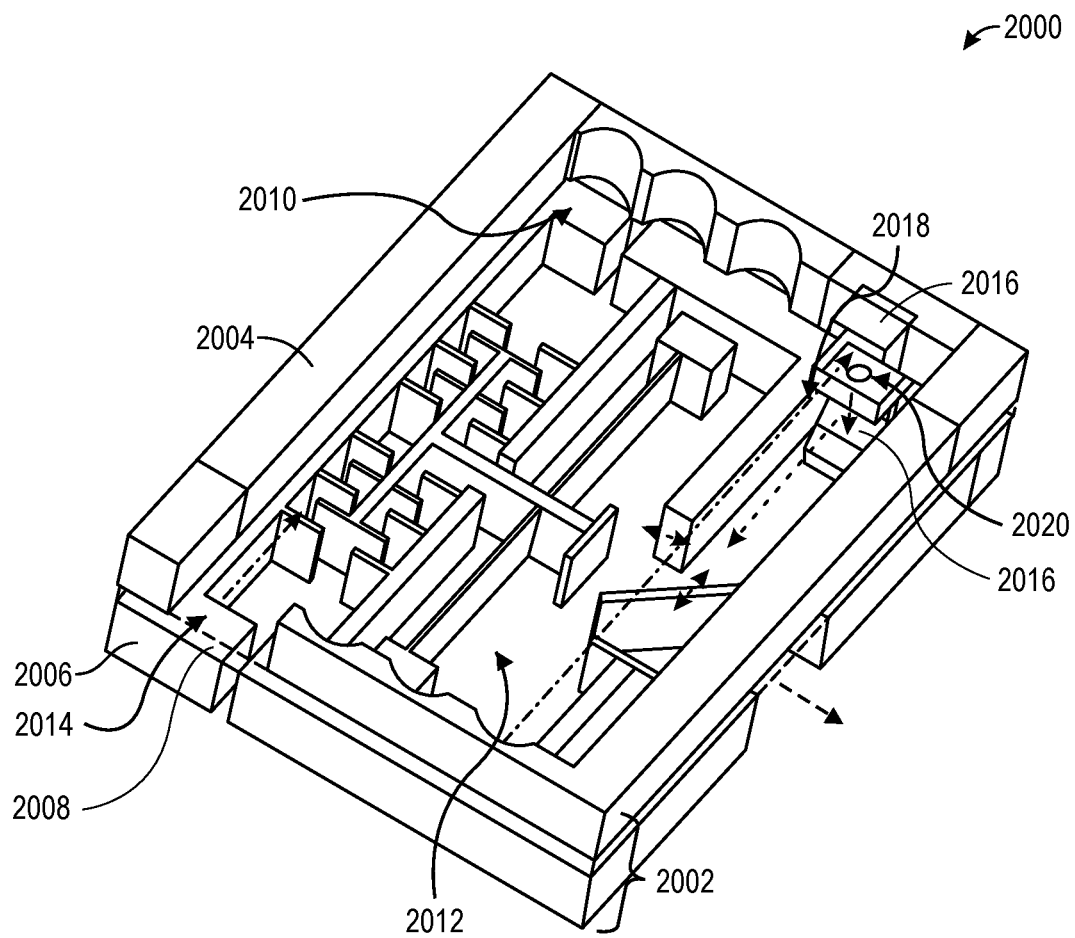
FIG. 20 is a diagram illustrating a compact configuration of the gas cell and MEMS spectrometer on the same die according to some aspects.

FIG. 20 is a diagram illustrating a compact configuration of the gas cell 2010 and MEMS spectrometer 2012 on the same die 2000 according to some aspects. The die 2000 includes a substrate (e.g., a silicon substrate or SOI substrate), which includes a device layer 2006 and a handle layer 2004. In the example shown in FIG. 20, the MEMS spectrometer 2012 is formed in the device layer 2006 and the gas cell 2010 is formed in the handle layer 2004. The MEMS spectrometer 2012 and gas cell 2010 may be separated by a thin layer 2008 of unetched silicon. A capping layer (not shown) may further be bonded to the handle layer 2004 to seal the gas cell 2010.

In the example shown in FIG. 20, the MEMS spectrometer 2012 is a MEMS-based Michelson interferometer. However, it should be understood that other spectrometer structures, such as a Mach Zender interferometer or a Fabry Perot interferometer may be used. In addition, the gas cell 2010 shown in FIG. 20 is a multi-pass gas cell. However, it should be understood that, in other examples, the gas cell 2010 may instead be a hollow waveguide gas cell.

Light may enter the gas cell 2010 via an optical input 2014, where the light is reflected multiple times up and down the gas cell 2010 through the volume of the gas until the light reaches the optical output 2018 of the gas cell 2010. Light coupling from the optical output 2018 of the gas cell 2010 to the optical input (not shown, for simplicity) of the MEMS spectrometer 2012 may be achieved using out-of-plane mirrors 2016. For example, the out-of-plane mirrors 2016 may be inclined mirrors at 45 degree angles to redirect the light from the in-plane direction at the optical output 2017 of the gas cell 2010 to the out-of-plane direction for propagation from the handle layer 2004 to the device layer 2006 and then again from the out-of-plane direction to the in-plane direction for input to the MEMS spectrometer 2012. In some examples, the light may be guided from the handle layer 2004 to the device layer 2006 via a through hole 2020 in the thin layer 2008 between the handle layer 2004 and the device layer 2006.

The out-of-plane mirrors 2016 may be monolithically integrated on the substrate 2002, as shown in FIG. 20, or formed in an external mold that may be attached to the substrate 2002 at the optical output 2018 of the gas cell 2010 and optical input of the MEMS spectrometer 2012. For example, the out-of-plane mirrors 2016 on the external mold may include vertical corner cube mirrors for redirecting the light between the in-plane direction and out-of-plane direction.

Figure 21:
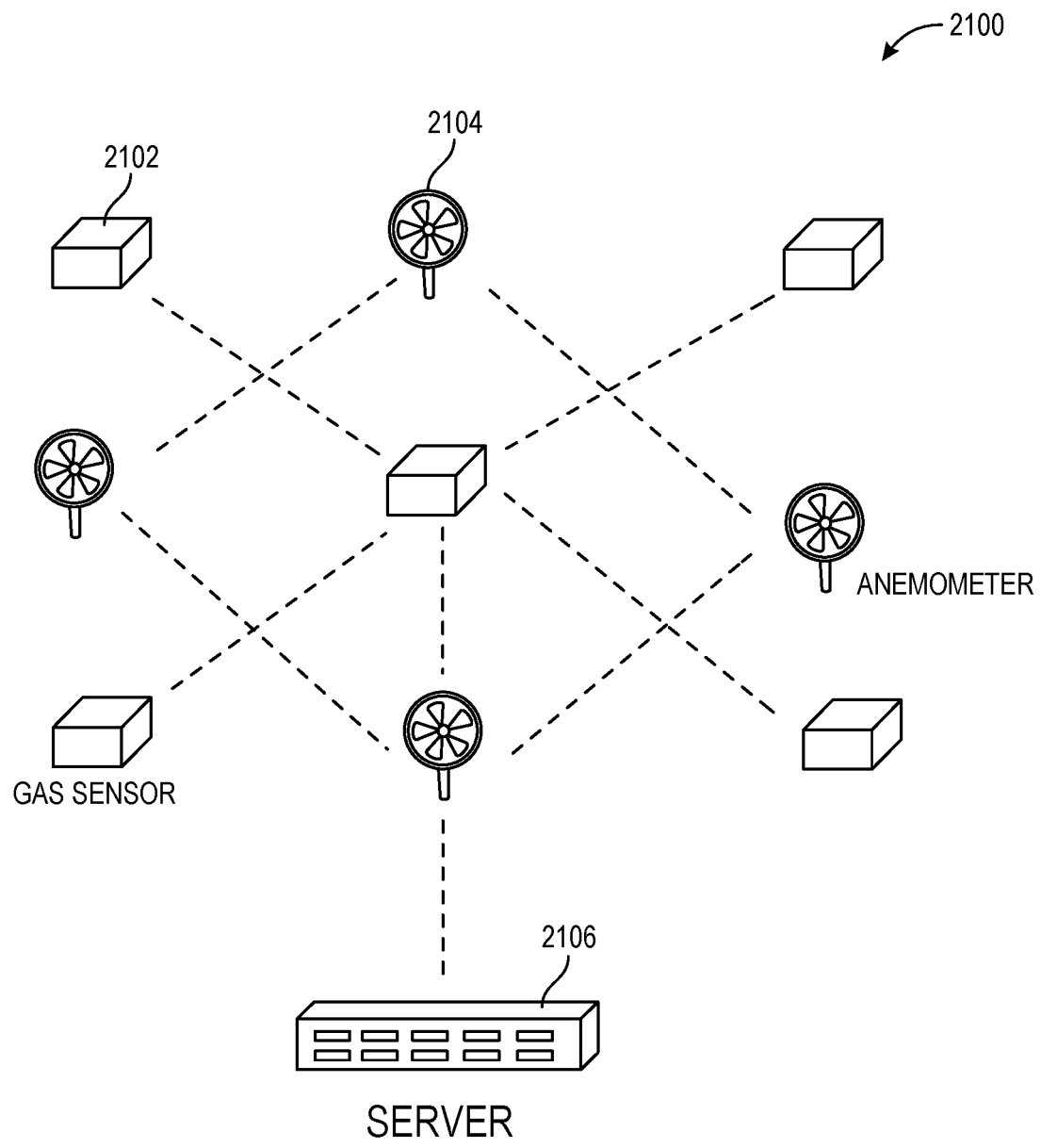
FIG. 21 is a diagram illustrating an example of a pollution mapping system including a plurality of gas sensors according to some aspects of the disclosure.

FIG. 21 is a diagram illustrating an example of a pollution mapping system 2100 including a plurality of gas sensors 2102 according to some aspects of the disclosure. Each gas sensor 2102 may include a miniaturized gas cell, spectrometer, and processing circuitry for analysis of the gas in the gas cell. For example, each gas sensor 2102 may include a die 1900 or 2000 including an integrated gas cell and spectrometer, as shown in FIG. 19 or 20. The gas sensors 2102 may be deployed at different locations, as depicted in FIG. 21. In addition, a plurality of anemometers 2104 may be deployed at other locations to map wind direction and where the gases are transferred. The gas sensors 2102 and anemometers 2104 may be connected over a network to a common server 2106. Using reported data from the gas sensors 2102 and anemometers 2104, the server 2106 may be configured to build a pollution map.

Figure 22A:
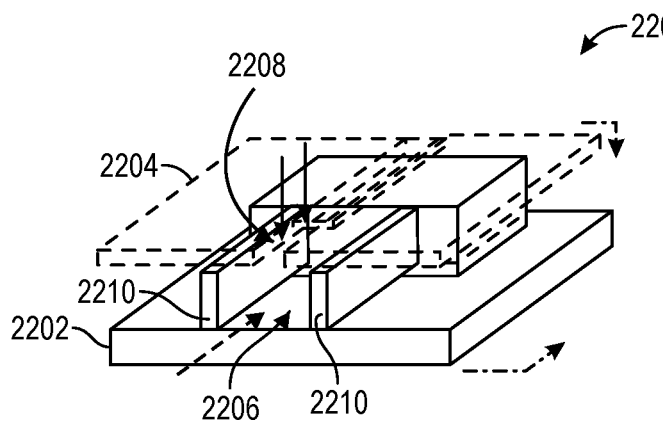
FIGS. 22A-22C are diagrams illustrating an example of a photo-acoustic gas cell according to some aspects.
Figure 22B:
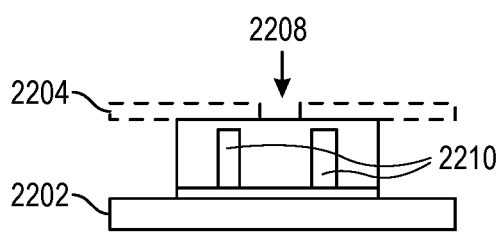
Figure 22C:
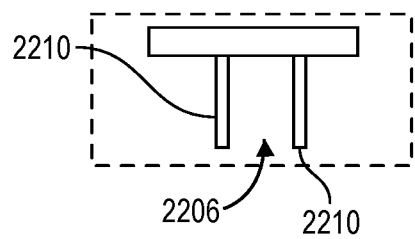

FIGS. 22A-22C are diagrams illustrating an example of a photo-acoustic gas cell 2200 according to some aspects. FIG. 22A is a three-dimensional view of the photo-acoustic gas cell 2200, FIG. 22B is a side view of the photo-acoustic gas cell 2200, and FIG. 22C is a top view of the photo-acoustic gas cell 2200. Photo-acoustic cells 2200 are characterized by their small volume since the detection is independent of the cell length, but rather is dependent on the cross-section area of the cell.

The photo-acoustic gas cell 2200 may be formed in a substrate 2202 (e.g., a silicon or SOI substrate) using semiconductor fabrication technology. A capping layer 2204 may be bonded to the substrate 2202 to seal the photo-acoustic gas cell 2200 on the top. In the example shown in FIG. 22, light may be coupled into the photo-acoustic gas cell 2200 at an optical input 2206 (e.g., an opening in the substrate 2202) in the plane parallel to the substrate 2202, while gas (or other suitable fluid) is injected via openings or through holes in the capping layer 2204 in the vertical direction that is in the plane perpendicular to the substrate 2202.

The photo-acoustic gas cell 2200 further includes two cantilever beams 2210, which are released from the substrate 2202, as can be seen in FIG. 22B. The two cantilever beams 2210 act as microphones for acoustic waves. For example, when modulated light is injected into the photo-acoustic cell 2200, an acoustic wave is formed in the air, which causes the beams 2210 to deflect in the lateral direction with the same modulation frequency. The movement of the cantilever beams 2210 may be detected, for example, by an interferometer (not shown).

Figure 23A:
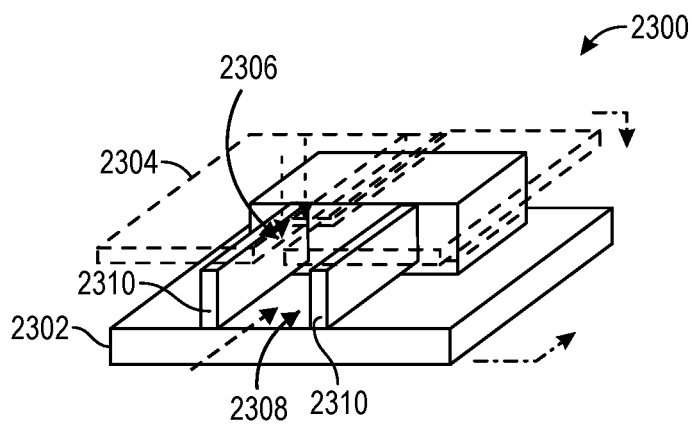
FIGS. 23A-23C are diagrams illustrating another example of a photo-acoustic gas cell according to some aspects.
Figure 23B:
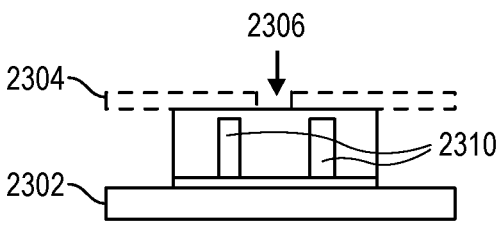
Figure 23C:
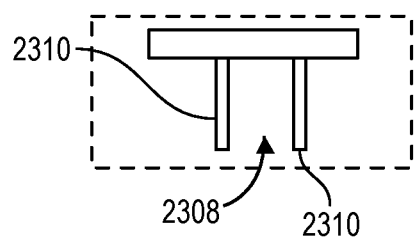

FIGS. 23A-23C are diagrams illustrating another example of a photo-acoustic gas cell 2300 according to some aspects. FIG. 23A is a three-dimensional view of the photo-acoustic gas cell 2300, FIG. 23B is a side view of the photo-acoustic gas cell 2300, and FIG. 23C is a top view of the photo-acoustic gas cell 2300. The photo-acoustic gas cell 2300 may be formed in a substrate 2302 (e.g., a silicon or SOI substrate) using semiconductor fabrication technology. A capping layer 2304 may be bonded to the substrate 2302 to seal the photo-acoustic gas cell 2300 on the top. In the example shown in FIGS. 23A-23C, light may be coupled into the photo-acoustic gas cell 2300 at an optical input 2306 (e.g., an opening or through hole in the capping layer 2304) in the plane perpendicular to the substrate 2202, while gas (or other suitable fluid) is injected via openings in the substrate 2308 in the plane parallel to the substrate 2302. The photo-acoustic gas cell 2300 further includes two cantilever beams 2310, which are released from the substrate 2302, as can be seen in FIG. 23B. The two cantilever beams 2210 act as microphones for acoustic waves, similar to that described above in connection with FIGS. 22A-22C.

Figure 24:
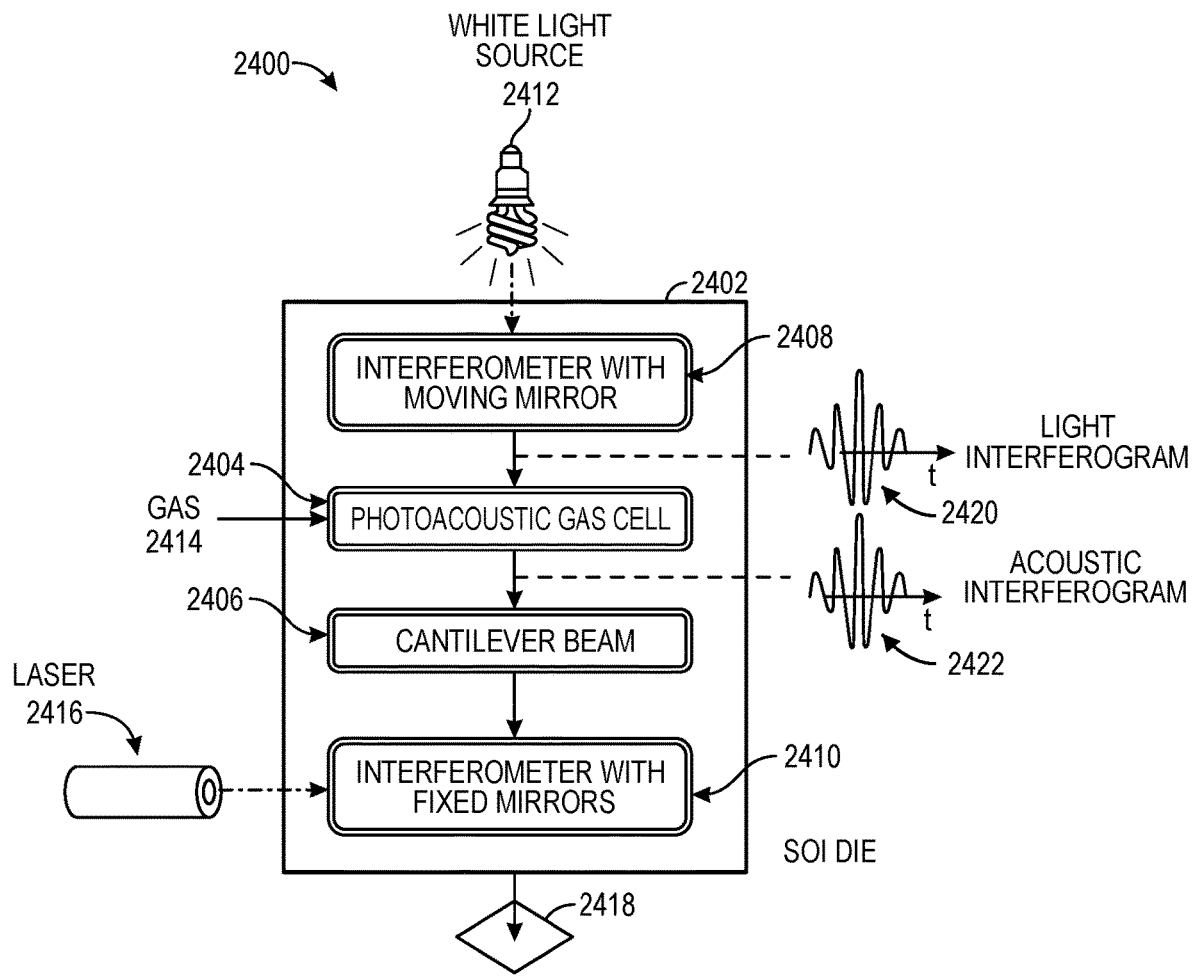
FIG. 24 is a diagram illustrating an example of a gas analysis device including a photo-acoustic gas cell according to some aspects.

FIG. 24 is a diagram illustrating an example of a gas analysis device 2400 including a photo-acoustic gas cell 2404 according to some aspects. The gas analysis device 2400 includes a die 2402 (e.g., an SOI die) including an integrated photo-acoustic gas cell 2404, a cantilever beam 2406 of the photo-acoustic gas cell 2404 (the photo-acoustic gas cell 2404 may include two cantilever beams, one of which is shown, for convenience), an input interferometer 2408 with fixed and moving mirrors, and an output interferometer 2410 including a fixed mirror. The input interferometer 2408 may be optically coupled to receive an input light beam from a white light source 2412 and to produce a white light interferogram 2420. The white light interferogram 2420 produced by the input interferometer 2408 may operate as the modulated input light to the photo-acoustic gas cell 2404. Thus, the output from the input interferometer 2408 may be optically coupled to an optical input of the photo-acoustic gas cell 2404.

The white light interferogram 2420 injected into the photo-acoustic gas cell 2404 causes the cantilever beam 2406 to deflect. With a gas 2414 (or other suitable fluid) injected into the photo-acoustic gas cell 2404, the beam deflection of the cantilever beam 2406 may be measured by the output interferometer 2410 with a discrete laser source 2416 and a detector 2418. For example, one of the mirrors of the output interferometer 2410 may be the moving cantilever beam 2406, while the other mirror may be fixed. The input and output interferometers 2408 and 2410 may be, for example, Michelson or Fabry Perot interferometers. In some examples, one or more of the light sources 2412 and 2416 or detector 2418 may be integrated on the die 2402. In other examples, as shown in FIG. 24, the light sources 2412 and 2416 and detector 2418 may be external to the die 2402.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-24 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-24 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An integrated device for fluid analysis, comprising:
a substrate;
a die comprising a gas cell, the gas cell comprising:
 a bottom surface and sidewalls formed in the substrate;
 at least one gas inlet and at least one gas outlet coupled for injection of a fluid into and out of the gas cell, respectively;
 an optical input and an optical output, each optically coupled to direct light into and out of the gas cell, respectively, wherein the light is guided in the gas cell by the sidewalls and the bottom surface of the gas cell; and
 a capping layer bonded to the substrate to seal the gas cell, the capping layer comprising an interior surface forming a top surface of the gas cell, wherein the light is guided in the gas cell further by the top surface of the gas cell.

2. The integrated device of claim 1, wherein at least one of the bottom surface, the top surface, or the sidewalls are coated with a reflective material.

3. The integrated device of claim 1, wherein the reflective material comprises a metal selected from the group consisting of aluminum, gold, and silver or the reflective material comprises a dielectric coated metal.

4. The integrated device of claim 1, wherein the at least one gas inlet and the at least one gas outlet each comprise respective through holes in the capping layer or the substrate.

5. The integrated device of claim 1, wherein at least one of the sidewalls, the bottom surface, or the top surface comprise silicon Bragg mirrors.

6. The integrated device of claim 1, wherein the substrate is a silicon substrate or a silicon on insulator (SOI) substrate including at least a device layer and a handle layer, wherein the bottom surface and the sidewalls of the gas cell are formed in the device layer.

7. The integrated device of claim 1, wherein the optical input comprises an input optical component optically coupled to redirect the light from an out-of-plane direction to an in-plane direction and the optical output comprises an output optical component optically coupled to redirect the light from the in-plane direction to the out-of-plane direction, wherein the in-plane direction comprises an in-plane optical axis of the gas cell that is perpendicular to the out-of-plane direction.

8. The integrated device of claim 1, wherein the gas cell comprises a hollow waveguide comprising a waveguide pattern formed by the sidewalls, the waveguide pattern defining a light path of the light propagating in the gas cell.

9. The integrated device of claim 8, wherein the waveguide pattern comprises an array of horizontal waveguides optically coupled via respective corner cube mirrors or respective circular toruses.

10. The integrated device of claim 8, wherein the waveguide pattern is formed by the sidewalls formed in the substrate and additional corresponding sidewalls formed in the capping layer.

11. The integrated device of claim 1, wherein the gas cell comprises a multi-pass gas cell, the multi-pass gas cell comprising:
 a set of two or more curved reflectors formed in the substrate and optically coupled to receive the light from the optical input and configured to reflect the light within the multi-pass gas cell to produce multiple reflections of the light, wherein the optical output is optically coupled to receive output light resulting from the multiple reflections of the light.

12. The integrated device of claim 11, wherein the light is guided in an in-plane direction by the set of two or more curved reflectors and an out-of-plane direction by the bottom surface of the gas cell and the top surface of the gas cell.

13. The integrated device of claim 11, wherein the set of two or more curved reflectors comprises a first array of curved mirrors positioned along a first side of the gas cell and a second array of curved mirrors positioned along a second side of the gas cell opposite the first side, wherein the first array of curved mirrors are offset with respect to the second array of curved mirrors.

14. The integrated device of claim 13, wherein the optical input is on the first side of the gas cell and optically coupled to direct the light to a first curved mirror of the second array of curved mirrors and the optical output is on the second side of the gas cell and optically coupled to receive the light from a last curved mirror of the first array of curved mirrors.

15. The integrated device of claim 11, wherein:
 the set of two or more curved reflectors comprises a first array of curved mirrors positioned along a first side of the gas cell, a second array of curved mirrors positioned along a second side of the gas cell opposite the first side, a third array of curved mirrors positioned along a third side of the gas cell, and a fourth array of curved mirrors positioned along a fourth side of the gas cell opposite the third side,
 the first array of curved mirrors and the second array of curved mirrors form a first pair of curved mirror arrays and the third array of curved mirrors and the fourth array of curved mirrors form a second pair of curved mirror arrays,
 the first pair of curved mirror arrays is perpendicular to the second pair of curved mirror arrays, and
 the first array of curved mirrors are offset with respect to the second array of curved mirrors and the third array of curved mirrors are offset with respect to the fourth array of curved mirrors.

16. The integrated device of claim 15, further comprising:
 a tilted mirror optically coupled to direct the light from the first pair of curved mirror arrays to the second pair of curved mirror arrays.

17. The integrated device of claim 15, wherein the optical input is on the first side of the gas cell and optically coupled to direct the light to a first curved mirror of the second array of curved mirrors and the optical output is on the fourth side of the gas cell and optically coupled to receive the light from a last curved mirror of the third array of curved mirrors.

18. The integrated device of claim 1, wherein the gas cell comprises a circular multi-pass gas cell and wherein the optical input has a different spatial orientation than the optical output.

19. The integrated device of claim 18, wherein the circular multi-pass gas cell comprises one-piece circular metallized mirror or a one-piece circular Bragg mirror.

20. The integrated device of claim 18, wherein the circular multi-pass gas cell comprises a concentric array of curved mirrors.

21. The integrated device of claim 20, wherein the curved mirrors in the concentric array of curved mirrors comprise cylindrical metallized mirrors or cylindrical Bragg mirrors.

22. The integrated device of claim 1, further comprising:
a light source integrated on the die and configured to generate the light at the optical input of the gas cell.

23. The integrated device of claim 1, further comprising:
a micro-electro-mechanical-systems (MEMS) spectrometer integrated on the die, wherein the optical output of the gas cell is attached to an additional optical input of the MEMS spectrometer.

24. The integrated device of claim 1, further comprising:
at least one sensor integrated on the die.

25. The integrated device of claim 24, wherein the at least one sensor comprises a pressure sensor formed of a vertical membrane, the vertical membrane comprising a first side facing an inside of the gas cell and a second cell facing an outside of the gas cell, wherein deflection of the vertical membrane represents a pressure difference between the inside of the gas cell and the outside of the gas cell.

26. The integrated device of claim 25, wherein the pressure sensor further comprises a first electrode comprising the vertical membrane and a second electrode, wherein the pressure difference is measured by measuring a capacitance between the first electrode and the second electrode.

27. The integrated device of claim 25, wherein the pressure sensor further comprises an optical fiber forming a Fabry Perot interferometer with the vertical membrane, wherein the pressure difference is measured by the Fabry Perot interferometer.

28. The integrated device of claim 24, wherein the at least one sensor comprises a temperature sensor, wherein the temperature sensor is formed on the interior surface of the capping layer.

29. The integrated device of claim 28, wherein the temperature sensor comprises a resistor formed of a pattern of platinum deposited on the interior surface of the capping layer.

30. The integrated device of claim 29, wherein the resistor is located at the at least one gas inlet of the gas cell, and further comprising an additional resistor located at the at least one gas outlet of the gas cell, wherein the resistor and the additional resistor form an air flow sensor configured to measure an air flow in the gas cell based on a temperature gradient across the gas cell.

31. The integrated device of claim 7, further comprising:
a mold attached to the capping layer and comprising the input optical component and the output optical component, wherein the input optical component and the output optical component are each attached to the substrate within respective openings thereof, wherein the input optical component and the output optical component each comprise a respective inclined mirror.

32. The integrated device of claim 7, wherein the input optical component and the output optical component each comprise a respective inclined mirror formed in the substrate.

33. An integrated device for fluid analysis, comprising:
a substrate;
a multi-pass gas cell comprising:
a bottom surface and sidewalls formed in the substrate;
at least one gas inlet and at least one gas outlet coupled for injection of a fluid into and out of the multi-pass gas cell, respectively;
an optical input and an optical output, each optically coupled to direct light into and out of the multi-pass gas cell, respectively, wherein the light is guided in the gas cell by the sidewalls and the bottom surface of the multi-pass gas cell;
a capping layer bonded to the substrate to seal the multi-pass gas cell, the capping layer comprising an interior surface forming a top surface of the multi-pass gas cell, wherein the light is guided in the multi-pass gas cell further by the top surface of the multi-pass gas cell; and
a set of two or more curved reflectors formed in the substrate and optically coupled to receive the light from the optical input and configured to reflect the light within the multi-pass gas cell to produce multiple reflections of the light, wherein the optical output is optically coupled to receive output light resulting from the multiple reflections of the light.

34. The integrated device of claim 33, wherein the light is guided in an in-plane direction by the set of two or more curved reflectors and an out-of-plane direction by the bottom surface of the gas cell and the top surface of the gas cell.

35. An integrated device for fluid analysis, comprising:
a substrate;
a circular multi-pass gas cell comprising:
a bottom surface and sidewalls formed in the substrate;
at least one gas inlet and at least one gas outlet coupled for injection of a fluid into and out of the circular multi-pass gas cell, respectively;
an optical input and an optical output, each optically coupled to direct light into and out of the circular multi-pass gas cell, respectively, wherein the light is guided in the circular multi-pass gas cell by the sidewalls and the bottom surface of the gas cell, wherein the optical input has a different spatial orientation than the optical output; and
a capping layer bonded to the substrate to seal the circular multi-pass gas cell, the capping layer comprising an interior surface forming a top surface of the circular multi-pass gas cell, wherein the light is guided in the circular multi-pass gas cell further by the top surface of the circular multi-pass gas cell.

* * * * *